United States Patent [19]

Miura et al.

[11] Patent Number: 5,677,709

[45] Date of Patent: Oct. 14, 1997

[54] MICROMANIPULATOR SYSTEM WITH MULTI-DIRECTION CONTROL JOY STICK AND PRECISION CONTROL MEANS

[75] Inventors: Makoto Miura, Kameoka; Kohji Inoue; Mitsuo Yamashita, both of Kyoto; Takahiro Kaneuchi, Muko, all of Japan

[73] Assignee: Shimadzu Corporation, Kyoto, Japan

[21] Appl. No.: 384,825

[22] Filed: Feb. 7, 1995

[30] Foreign Application Priority Data

| Feb. 15, 1994 | [JP] | Japan | 6-18309 |
| Apr. 19, 1994 | [JP] | Japan | 6-80584 |
| Apr. 19, 1994 | [JP] | Japan | 6-80585 |
| Apr. 20, 1994 | [JP] | Japan | 6-81207 |

[51] Int. Cl.[6] .................................................. G09G 5/08
[52] U.S. Cl. ................................. 345/161; 364/167.01
[58] Field of Search .............................. 395/156, 161, 395/157, 159, 163; 74/471 XY; 364/167.01, 474.22, 474.28, 188; 359/368

[56] References Cited

U.S. PATENT DOCUMENTS 5,325,289  6/1994  Togawa ...................... 364/474.22

*Primary Examiner*—Regina D. Liang
*Attorney, Agent, or Firm*—Nikaido, Marmelstein, Murray & Oram LLP

[57] ABSTRACT

A micromanipulator system has a microscope, a micromanipulator for three-dimensionally manipulating a fine instrument in the field of the microscope, an image pick-up device for picking up an image within the microscope field, reference position setting device for setting a reference position of the micromanipulator along a height direction, a detecting device for detecting a height position of a tip portion of the manipulator as positional information measured from the reference position along the height direction, and a display device for combining the image of the image pick-up device with the positional information detected by the detecting device to display the combined image thereon. A joystick effects movement in each axial direction of the micromanipulators allows for precise positioning of a fine instrument positioned on the micromanipulator. The system also has an angle setting device for setting the movement angle with respect to specimens in a petri dish disposed on a portion of the micromanipulator system. The joy stick includes a manipulating lever which is swingable in an arbitrary direction with the center of a base. X- and Y-axial direction detectors detect the inclined angle and the neutral position of the manipulating lever. A position control signal or a speed control signal is output based on detection result of the detectors. The micromanipulator system includes a stepper motor driven at microsteps, and other elements which enable control at arbitrary angles, which improves operability. The micromanipulator is configured to be driven at a constant frequency with variable speed, and under continuous speed control, without employing a high frequency oscillator.

4 Claims, 20 Drawing Sheets

MICROMANIPULATOR SYSTEM WITH MULTI-DIRECTION CONTROL JOY STICK AND PRECISION CONTROL MEANS

BACKGROUND OF THE INVENTION

A) Field of the Invention

The present invention relates to a micromanipulator system equipped with a microscope, and more particularly to a micromanipulator system configured to three-dimensionally manipulate a fine tool wherein a multi-direction control joystick coupled to a plurality of stepper motors moves the tool within the field of view of a microscope, the stepper motor having a stepper angle that is subdivided into preselected reference subdividing units.

B) Description of Related Art

In current biological research, for instance where a DNA solution is injected into a cell, fine and delicate manipulation of precise tools is necessary. Micromanipulator systems have been developed which include a fine needle mounted on a micromanipulator. Such work is usually associated with a microscope for observing the cell and the injecting process. In the micromanipulator System of this type, a joy stick for X- and Y-axes which is tiltable forward and backward and rightward and leftward.

There are many case where the fine instrument such as the fine needle which is held to a tip of the micromanipulator is usually arranged with an inclined angle with respect to a horizontal plane (X-Y plane). Accordingly, for the purpose of moving the fine instrument in a longitudinal direction thereof, it is necessary to drive the fine instrument in a synthetic direction which synthesizes a horizontal direction (X-axial direction, Y-axial direction or its synthetic direction) and a vertical direction (Z-axial direction). In the abovementioned joy stick, it is difficult to manipulate the fine instrument simultaneously in a plurality of directions in accordance with the longitudinal direction of the fine instrument. In particular, it is difficult to perform the movement control of the fine instrument with accuracy.

To drive the micromanipulator along the three axis directions (X-axis, Y-axis, Z-axis directions), stepper motors are independently employed along the respective axial directions. A stepper motor can achieve highly precise positioning in response to the number of input pulse.

Problem to be Solved

Further, as mentioned above, the fine instrument is arranged with an inclined angle with respect to the horizontal plane (X-Y plane), and to perform the fine vibrations by use of the usual micromanipulator, it is necessary to drive the fine instrument in the synthetic directions more than two axes. In the conventional micromanipulator, because no structure in which the fine instrument is moved at an arbitrary angle, it is difficult to perform such fine vibrations along the longitudinal direction of the fine instrument.

Moreover, in the case where the tip position of the fine needle is moved by use of the joy stick while being recognized with eyes through a microscope or the like, it is difficult to move it to a target position with accuracy. Even in this case, the fine needle is required to move along the longitudinal direction, and the conventional micromanipulator cannot make the fine needle move at an arbitrary angle for an arbitrarily set distance with accuracy.

In the case of providing the manipulator for moving the fine instrument along the longitudinal direction, the number of parts is increased, the device is large-sized and it is difficult to reduce the costs. Also, it is necessary to additionally provide a manipulating section for manipulating that manipulator, resulting in troublesome in manipulations.

It is considered that a micromanipulator of the friction type is used which is general in the field of the micromanipulator, and as movement modes of the micromanipulator, there are provided a speed control mode in which an actuator is driven at a speed corresponding to the inclined amount of the manipulating lever for the joy stick and a position control mode in which the actuator is driven by a distance corresponding to the inclined amount of the manipulating lever, and switching between both the control modes are performed by a change-over switch provided on the manipulating panel.

However, in that construction, when the mode is switched from the position control mode to the speed control mode under the state where the joy stick is inclined, an arm portion of the micromanipulators automatically starts to be moved regardless of the intention of the operator (comes to a runaway state).

With the above-described conventional arrangement, the positional relationship within the horizontal axis may be judged with respect to the positional relationship between the fine sample and the fine instrument, while observing the display screen. However, the positional relationship with respect to the Z-axis direction (i.e., height direction) should be judged based on only the focal shift. For instant, the positional relationship along the height direction is judged by focalizing the fine sample and subsequently focalizing the fine instrument. As a result, only a highly experienced operator can judge this positional relationship along the height direction, and therefore most of the operators meet difficulties to judge such a height positional relationship and to manipulate the fine instrument. This would impede an improvement in operabilities of the micromanipulator.

In the above-mentioned micromanipulator system, when the pulse generator by the calculation means is employed, it is practically difficult to produce the pulses at the high frequencies. Thus, it is technically difficult to increase and/or continuously vary the moving speed of the micromanipulator.

Furthermore, in the micromanipulator system, there are many possibilities that the fine instrument held at the tip portion is arranged in such a manner that it is inclined with respect to the horizontal plane (X-Y plane) at a certain angle. In order that such a fine instrument is moved along a longitudinal direction thereof, the micromanipulator must be driven along such a direction defined by synthesizing a plurality of axial directions. The moving amounts of the micromanipulator along the respective axial directions may be determined by a ratio of manipulation amounts based on the moving angle. However, when the stepper motors along the respective axial directions are driven in accordance with the above-described manner, since the moving speeds are discontinued, it is difficult to smoothly move the manipulator along the longitudinal direction of the fine instrument. Accordingly, there is a risk that the movement of the micromanipulator represents a coasting. To prevent such a coasting, the control period as well as the maximum speed maybe improved. However, under such an improvement, high cost components are necessarily required, which may impede cost down solutions.

SUMMARY OF THE INVENTION

An object of the present invention is to prevent occurrence of a runaway state in the operation of switching between the position control mode and the speed control mode.

An object of the present invention is to provide a manipulator system which is capable of moving a micromanipulator at an arbitrary angle, and making the operability improved.

Another object of the present invention is to provide a manipulator system which is capable of performing the fine vibrations at an arbitrary angle.

Still another object of the present invention is to provide a manipulator system which is capable of moving a fine equipment at an instrument arbitrary angle for a set distance with accuracy.

Another object of the present invention is such that a micromanipulator can be driven at a constant frequency and in a variable speed, whereby a continuous speed control can be achieved.

Another object of the present invention is such that when stepper motors are simultaneously driven along a plurality of axial directions to move a fine instrument along a direction defined by synthesizing multiple axes, a smooth movement of a micromanipulator can be achieved.

Another object of the present invention is to improve operabilities of the micromanipulator.

In one aspect of the present invention, there is proposed a structure in which a one-dimensional manipulator is fitted to the tip portion of the three-dimensional manipulator along the longitudinal direction of the fine instrument.

The manipulator system of the present invention includes a multi-direction control joy stick having a manipulating lever, a detection means, a first control signal generation means, a second control signal generation means, a reception means, a first switching means, and a second switching means. The manipulating lever is capable of being swung in an arbitrary direction with a center of a base. The detection means detects an inclined angle and a neutral position of the manipulating lever. The first control signal generation means outputs a position control signal on the basis of the detection result of the detection means. The second control signal generation means outputs a speed control signal on the basis of the detection result of the detection means. The reception means receives a switching command for switching an operable one between the first and second control signal generation means. The first switching means, when the reception means receives the switching command during the operation of the first control signal generation means and when the detection means detects the neutral position of the manipulating lever, switches to the second control signal generation means of the operable one. The second switching means, when the reception means receives the switching command during the operation of the second control signal generation means, switches to the first control signal generation means which is operable.

The multi-direction control joy stick may include a rotating thumbscrew rotatably fitted to the manipulating lever and a rotation detection means for detecting a rotating angle and a neutral position of the rotating thumbscrew, wherein the first control signal generation means also outputs the position control signal on the basis of the detection result of the rotation detection means, wherein the second control signal generation means also outputs the speed control signal on the basis of the detection result of the rotation detection means, wherein the first switching means switches to the operable second control signal generation means when the reception means receives the switching command during the operation of the first control signal generation means and the rotation detection means detects the neutral position of the rotating thumbscrew, wherein the second switching means switches to the operable first control signal generation means when the reception means receives the switching command during the operation of the second control signal generation means, in a preferable manner.

Also, it is preferable to provide the reception means to the manipulating lever. Further, it is preferable that the reception means has a push button provided on the tip of the manipulating lever.

It is preferable that the multi-direction control joy stick is of a pair of joy sticks suitable in use with both hands. Also, it is preferable that it is of a joy stick for manipulating the micromanipulator.

OPERATION

In the multi-direction control joy stick according to the present invention, the detection means detects the inclined angle and the neutral position of the manipulating lever. Then, on the basis of the detection result of the detection means, the first control signal generation means outputs the position control signal, and the second control signal generation means outputs the speed control signal. On the other hand, the reception means receives the switching command for switching the operable one between the first and second control signal generation means. When the reception means receives the switching commands during the operation of the first control signal generation means and the detection means detects the neutral position of the manipulating lever, the first switching means switches to the operable second control signal generation means. Also, when the reception means receives the switching command during the operation of the second control signal generation means, the second switching means switches to the operable first control signal generation means.

Since the switching means switches to the second control signal generation means first not only when the reception means receives the switching command during the operation of the first control signal generation means but also when the detection means detects the neutral position of the manipulating lever, the runaway state is prevented from occurring in the operation of switching between the position control mode and the speed control mode.

The multi-direction control joy stick of the invention may further include the rotating thumbscrew rotatably fitted to the manipulating lever, and the rotation detection means for detecting the rotating angle and the neutral position of the rotating thumbscrew, wherein the first control signal generation means also outputs the position control signal on the basis of the detection result of the rotation detection means, wherein the second control signal generation means also outputs the speed control signal on the basis of the detection result of the rotation detection means, wherein the first switching means switches to the operable second control signal generation means when the reception means receives the switching command during the operation of the first control signal generation means and the rotation detection means detects the neutral position of the rotating thumbscrew, and wherein the second switching means switches to the operable first control signal generation means when the reception means receives the switching command during the operation of the second control signal generation means. This makes the above operation more remarkable.

Also, when the reception means is provided in the manipulating lever, the operability is improved. Further, when the reception means has the push button provided on the tip of the manipulating lever, the operability is further improved.

In another aspect of the invention, the micromanipulator system of the present invention includes micromanipulators, a manipulating means, an angle setting means, an operating means, and a control means. The micromanipulators are provided independently in three axial directions which are orthogonal to each other for moving the fine instrument three-dimensionally. The manipulating means is capable of manipulating the fine instrument in each axial direction for specifying the movement position of the fine instrument. The angle setting means sets the movement instrument such as the fine instrument. The operating means calculates the ratio of the amount of movement of the micromanipulator in each axial direction on the basis of the manipulating amount of the manipulating means in a specified direction and the movement angle set by the :angle setting means. The control means supplies a control signal for each axial direction to the micromanipulator on the basis of the ratio of the movement amount from the operating means.

The micromanipulator further may include an amplitude/vibrating number setting means and a vibration control means. The amplitude/vibrating number setting means sets the amplitude and the number of vibration of the fine instrument when it is vibrated minutely. The vibration control means supplies the control signal for each axial direction to the micromanipulator on the basis of the ratio of the amount of movement calculated by the operating means according to the movement angle set by the angle setting means, and the amplitude and the number of vibrations set by the amplitude/vibrating number setting means, thereby to make the fine instrument vibrated minutely.

The micromanipulator further may include a distance/speed setting means and a thrust/pull-out control means. The distance/speed setting means sets the movement distance and the movement speed of the fine instrument at the time of the thrust/pull-out operation thereof. The thrust/pull-out control means gives the control signal for each axial direction to the micromanipulator on the basis of the ratio of the amount of movement calculated by the operating means according to the movement angle set by the angle setting means and the movement distance and the movement speed set by the distance/speed setting means, thereby to perform the thrust/pull-out operation of the fine instrument.

OPERATION

In the micromanipulator system of the present invention, the movement angle of the fine instrument is set by the angle setting means. The operating means calculates the ratio of the amount of movement of the micromanipulator in each axial direction on the basis of the manipulating amount of the manipulating means in a specified direction and the movement angle set by the angle setting means. The control means gives the control signal for each axial direction to the micromanipulator on the basis of the ratio of the amount of movement from the operating means to drive the micromanipulator at a set angle of movement. Therefore, the micromanipulator system is capable of driving the micromanipulator at an arbitrarily set angle, moving the fine instrument at an arbitrarily set angle by only the manipulation of the manipulating means in a specified direction so as to move the fine instrument along the longitudinal direction.

In the case of provision of the amplitude/vibrating number setting means and the vibration control means, the control signal for vibrating the micromanipulator minutely on the basis of the movement angle set by the angle setting means and the amplitude and the number of vibration set by the amplitude/vibrating number setting means is supplied to the micromanipulator. As a result, the fine instrument is capable of being vibrated minutely at the arbitrary angle, and the minute vibration of the fine instrument in the longitudinal direction thereof can be also performed.

In the case of provision of the distance/speed setting means and the thrust/pull-out control means, the control signal for each axial direction is supplied to the micromanipulator on the basis of the movement angle set by the angle setting means and the movement distance and the movement speed set by the distance/speed setting means. As a result the micromanipulator system is capable of moving the fine instrument at the arbitrary angle, in particular, for the set movement distance at the set movement speed in the longitudinal direction thereof with accuracy.

In another aspect of the invention, the micromanipulator system includes a microscope, image pick-up means, reference position setting means, detecting means, and display means. The micromanipulator three-dimensional manipulates a fine instrument in the field of microscope. The image pick-up means picks up an image in this field. The reference position setting means sets the reference position along the height direction of the micromanipulator. The detecting means detects a height position of a tip portion of the micromanipulator as positional information measured from the reference position along the height direction. The display means combines the image of the image pick-up means with the positional information detected by the detecting means to display thereon the combined image.

In the micromanipulator system according to the present invention, the reference position of the micromanipulator along the height direction is set by the reference position setting means. The height position of the tip portion of the micromanipulator is detected as the positional information measured from the reference position along the height direction. This height position of the tip portion of the micromanipulator is combined with the image of the image pick-up means, and then the resulting image is displayed on the display means. Accordingly, it is possible to readily judge the height position of the tip portion of the micromanipulator. Then, both the positional relationship between the fine sample and this tip portion of the micromanipulator along the height direction, and the positional relationships between the respective micromanipulators along the height direction can be easily judged, so that operabilities of the micromanipulator can be improved.

A micromanipulator system according another aspect of the present invention includes a stepper motor, a micromanipulator, input means, present position calculating means, speed calculating means, output pulse setting means, and energizing signal output means. The stepper motor is driven in a micro step mode while a stepping angle thereof is subdivided in a preselected reference subdividing unit. The micromanipulator causes a fine instrument to be transported by way of the stepper motor so as to process a fine sample. The input means inputs either the moving speed of the fine instrument or the moving position thereof. The present position calculating means calculates the present position of the stepper motor in unit of virtual subdivision which is obtained by subdividing the microstep by a predetermined dividing value. The speed calculating means calculates the drive speed of the stepper motor in the virtual subdividing unit based upon either the moving speed or the moving position, which are entered by the input means. The output pulse setting means determines a target output pulse in a reference subdivision unit based on both the present position calculated by the present position calculating means and the moving speed calculated by the speed calculating means. The energizing signal output means energizes the stepper motor in response to the target output pulse.

The micromanipulator system may be so constructed that to move the fine instrument along a plurality of axial directions, the stepper motors are separately provided on the micromanipulator, a moving ratio calculating means is further employed by which a ratio of moving amounts along the respective axial directions is calculated based on the moving angle of the fine instrument, and the input means calculates either the moving speed or the moving position along the respective axial directions based on the ratio of moving amounts.

In the micromanipulator system according to the present invention, the present position of the stepper motor is calculated in the virtual subdivision trait by the present position calculating means either the moving speed or the moving position, entered from the input means, is calculated in the virtual subdivision unit as the drive speed of the stepper motor. Both the present position of the stepper motor and the driving speed of the stepper motor are inputted into the output pulse setting means, so that the target output pulse is determined in the basic subdivision unit. The stepper motor is energized by the energizing signal in accordance with this target output pulse, and driven at either the moving speed, or the moving position, which are inputted from the input means.

When the stepper motors are independently mounted on the micromanipulators along a plurality of axial directions, a ratio of moving amounts along the respective axial directions is calculated by the moving ratio calculating means based upon the moving angle of the fine instrument, and the energizing signals of the stepper motors along the respective axial directions are calculated based upon this ratio of moving amounts, so that the stepper motors are driven at the moving angles As a consequence, the stepper motors can be driven at a constant frequency under variable speeds without the high frequency oscillator, and thus the continuous speed control can be achieved, also, the fine driving amount of the stepping motor can be set in correspondence with the ratio of moving amounts with respect to the movement along the direction defined by synthesizing the multiple axes, so that it is possible to prevent the coasting of the fine instrument.

These and other objects, features, aspects and advantages of the present invention will become more fully apparent from the following detailed description of the present invention when taken in conjunction with the accompanying drawings where like reference numerals denote corresponding parts throughout in which:

DETAILED DESCRIPTION OF THE EMBODIMENTS

Figure 1:
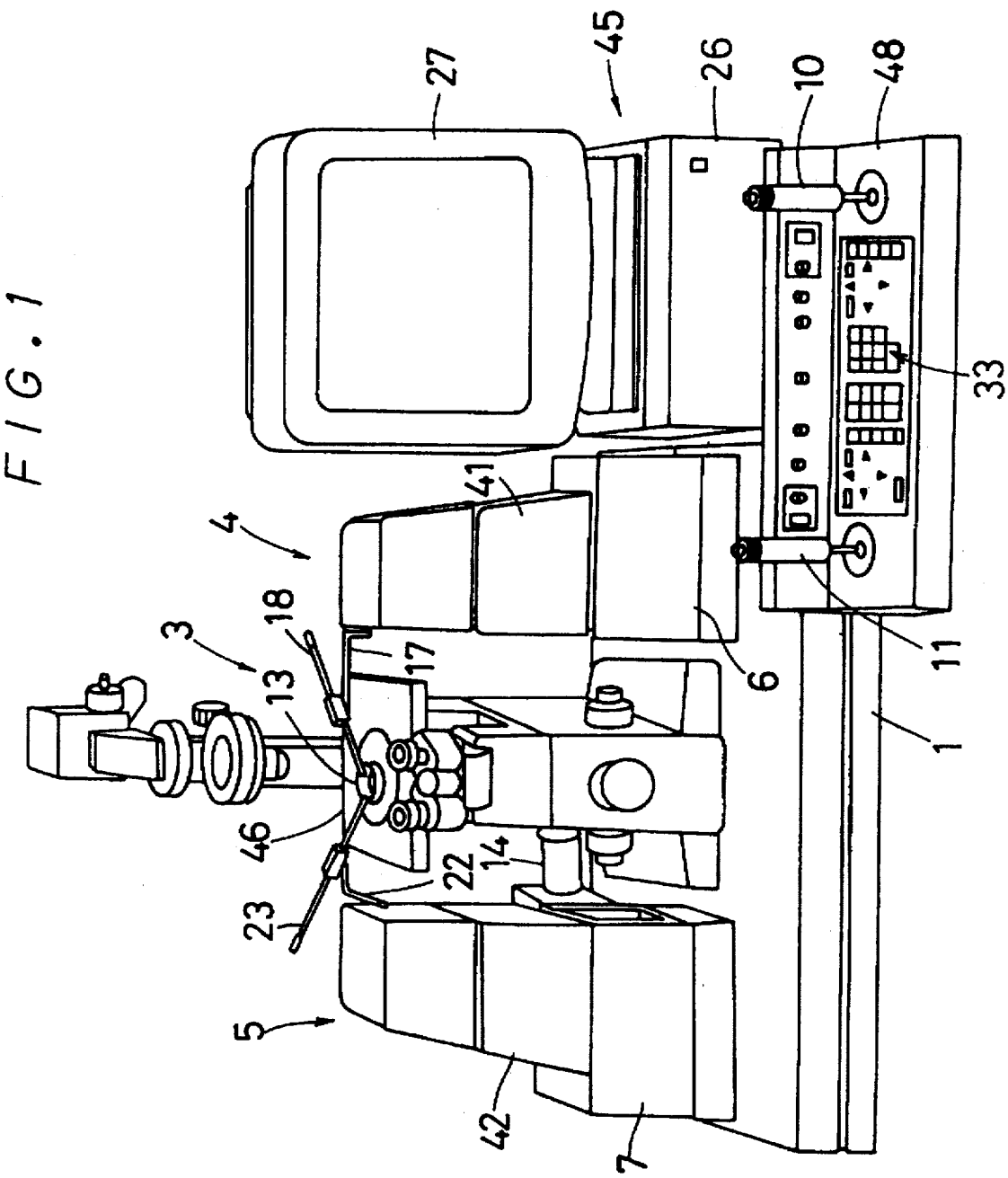
FIG. 1 is a perspective view showing a micromanipulator system in accordance with a first embodiment of the present invention.

FIG. 1 shows a micromanipulator system in accordance with a first embodiment of the present invention. The micromanipulator system includes a base 1, a microscope 3 mounted on the base 1, a pair of micromanipulators 4 and 5 arranged on both sides of the microscope 3, and a control unit 45 for controlling the microscope 3 and the micromanipulators 4 and 5, as is further described below.

The microscope 3 has a manipulating stage 46 in the center thereof, and a Petri dish 13 for accommodating a fine sample such as a cell is placeable on the manipulating stage 46. Disposed below the manipulating stage 46 is an objective lens (not shown). A TV camera 14 is connected to the lower portion of the objective lens. The manipulating stage 46 can be moved by a drive mechanism not shown in a horizontal direction (X- and Y-axial directions) and a vertical direction (Z-axial direction).

The micromanipulators 4 and 5 mainly include stages 6 and 7 and drivers 41 and 42 fitted onto the stages 6 and 7. The drivers 42 and 41 are capable of movement of 1 μm unit in X-, Y- and Z-axial directions, respectively. Arms 17 and 22 which move with the drivers 42 and 41, are disposed on the end portions of the drivers 42 and 41 on respective side ends of the microscope 4. The arms 17 and 22 are equipped with fine instruments 18 and 23 such as a probe for treating the sample.

The control device 45 may be any of a variety of electronic control devices, such as a personal computer or the like and includes a monitor 27, a manipulating panel 48 and a control unit 26. The manipulating panel 48 includes joysticks 10 and 11 for manipulating the two micromanipulators 4 and 5 in the X-, Y- and Z-axial directions, independently, and a key group 33 including a variety of keys.

Figure 2:
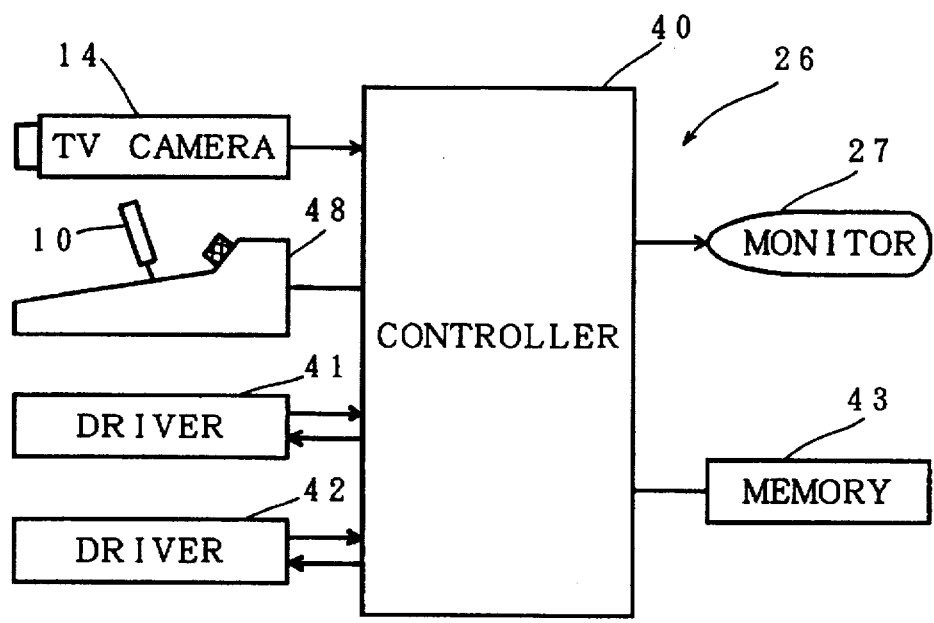
FIG. 2 is a block diagram showing the electronic interconnection of various portions of the micromanipulator system depicted in FIG. 1.

The control unit 26, as shown in FIG. 2, includes a controller 40 which has a microprocessor, RAM, ROM memory 43 and/or the like. Connected to the controller 40 are the TV camera 14, the manipulating panel 48 (and both joysticks 10 and 11), drivers 41 and 42 for driving the micromanipulators 4 and 5 in three axial directions, memory 43 for storing a variety of setting values, and a monitor 27 for displaying an image picked up by the TV camera 14. As is described in greater detail below, movement of the joystick 10 causes movement of the driver 42 (and hence movement of the fine instrument 18) and movement of the joystick 11 causes movement of the driver 43 (and hence movement of the fine instrument 23) with respect to the petri dish 13.

Figure 3:
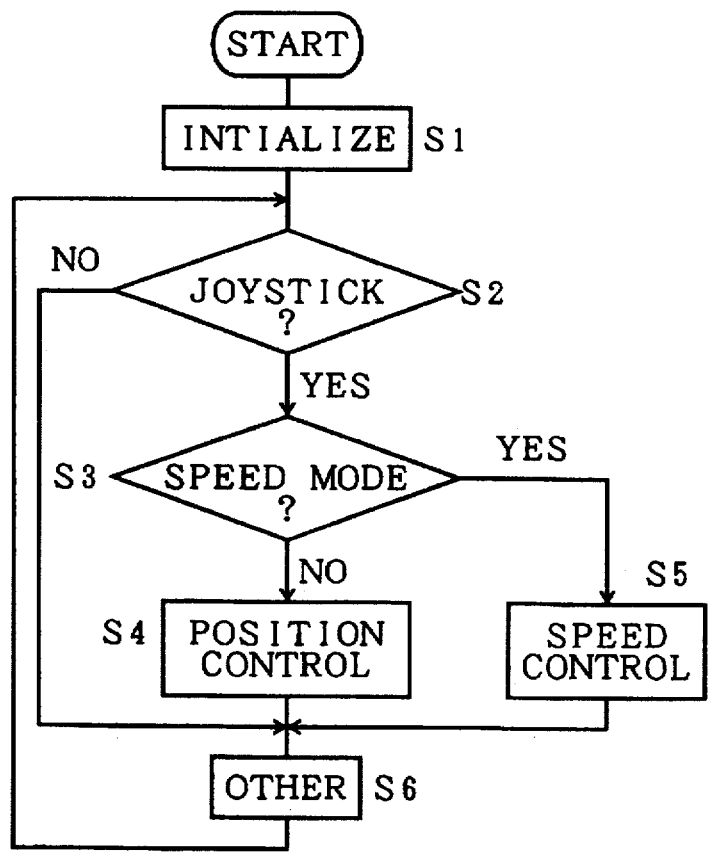
FIG. 3 is a control flowchart showing various operations of the micromanipulator system depicted in FIGS. 1 and 2.

The control function of the control unit 26 will be described with reference to a control flow chart shown in FIG. 3. First of all, at Step S1 in FIG. 3, an initial setting is executed. In this embodiment, for example, the drivers 41 and 42 are set to predetermined initial positions. At Step S2, it is determined whether the joystick 10 or 11 was manipulated. If the controller 40 determines that the joysticks 10 and 11 have not been manipulated, control is advanced to Step S6, to execute general processing.

At Step S2, if it is determined that one of the joysticks 10 and 11 was manipulated, control is moved to Step S8. At Step S2, it is determined whether the joysticks 10 and 11 were manipulated in accordance with the presence/absence of a control signal from the joy sticks. In the present invention, the control signal includes information for the control unit 26 as to whether movement of the joysticks 10 and 11 is to be fine movement or coarse movement. For instance, if the fine instruments 18 and 23 are to be moved quickly out of the range of the TV camera 14, coarse movement or fast movement would be desirable. Coarse movement or fast movement of the fine instruments 18 and 23 via the drivers 42 and 43 is possible when the control signal is set to a speed control mode, as is described further below. If the fine instruments 18 and 23 are to be moved only minute distances, for instance within the view of the TV camera 14, the control signal is set to a position control mode in accordance with a mode signal from the joysticks 10 and 11, as is described below.

At Step S3, it is determined whether the operation mode of the joysticks 10 and 11 is the position control mode or the speed control mode. When it is determined that the operation mode is the position control mode, control is moved to Step S4. At Step S4, the drivers 41 and 42 are driven in the X-, Y- and Z-axial directions under position control in accordance with the manipulating direction of the manipulated joysticks 10 and 11. At Step S3, if it is determined that the it is the speed control mode, control is moved to Step S5. At Step S5, the drivers 41 and 42 are driven in the X-, Y- and Z-axial directions in the speed control mode.

Figure 4:
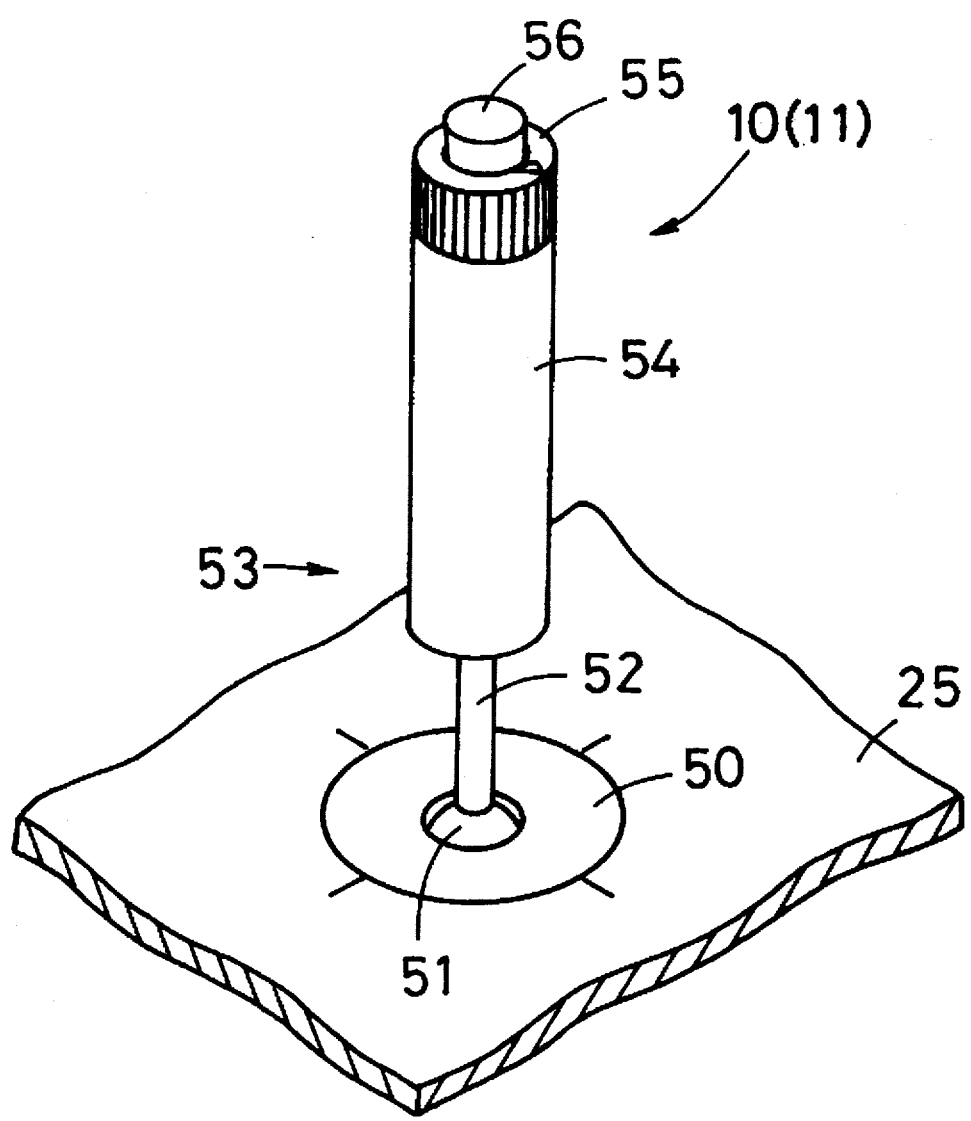
FIG. 4 is a fragmentary perspective view showing a joystick incorporated into the system depicted in FIGS. 1 and 2.
Figure 5:
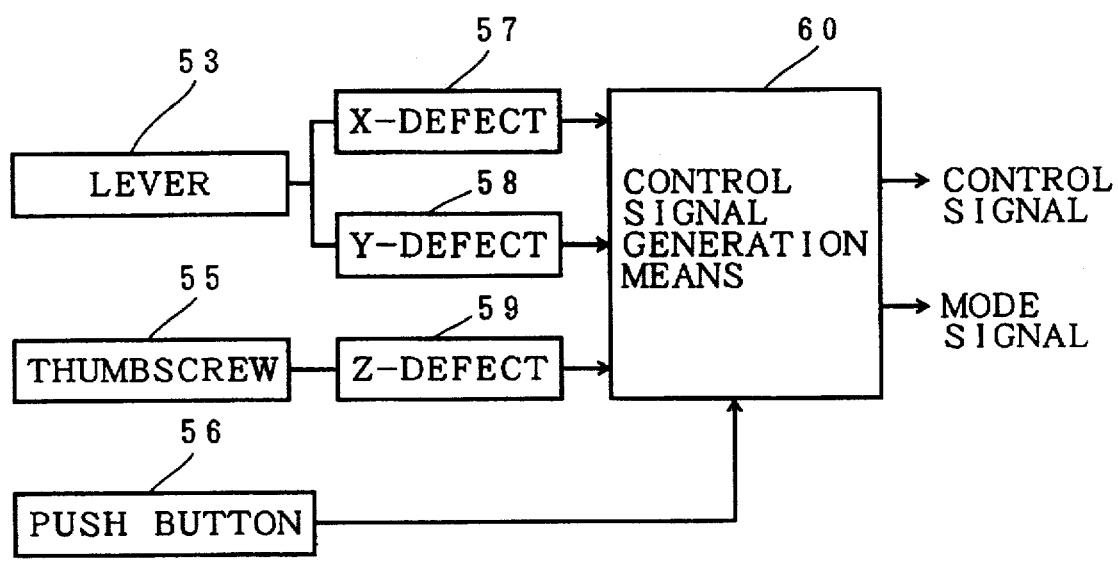
FIG. 5 is a control block diagram showing the electronic connection of various portions of the present invention.

Joysticks 10 and 11 are constructed as shown in FIGS. 4 and 5. Although the joysticks 10 and 11 are separate and control the movement of separate drivers (and hence fine instruments), they are typically constructed in the same manner. Therefore, description of one applies to both joysticks.

A support member 50 is fitted to the manipulating panel 48. A spherical body 51 is rotatably held by the support member 50. A bar portion 52 constituting the manipulating lever 53 extends from the upper end of the spherical body 51. A gripper 54 is fitted to the upper portion of the bar portion 52. A rotating thumbscrew 55 and a push button switch 56 are provided on the upper portion of the gripper 54. Provided inside of the support member 50 are an X-axial direction detector 57 and a Y-axial direction detector 58 for detecting a tilted angle of the manipulating lever 53. The X- and Y-axial direction detectors 57 and 58 may be, for instance, potentiometers for detecting the rotation angle of the manipulating lever 58 in the X- and Y-axial directions with respect to the center of the spherical body 51. The thumbscrew 55 also is connected to a detector 59, which detects the rotary displacement of the thumbscrew 55. The rotation angle of the rotating thumbscrew 55 causes Z-axial movement of the corresponding fine instrument, as is described below. The Z-axial direction detector 59 is arranged inside of the gripper 54 and may be a potentiometer, a rotary encoder or the like, which outputs a detection signal in accordance with the rotation angle of the rotating thumbscrew 55.

In the joystick shown in FIG. 4, the spherical body 51 is held to the support member 50 by friction. When the manipulating lever 53 is inclined, the inclined pose is maintained by that friction. A friction producing member (not shown) is interposed between the rotating thumbscrew 55 and the gripper 54, and when the rotating thumbscrew 55 is manipulated, the friction holds the manipulation position.

The outputs of the X-axial direction detector 57, the Y-axial direction detector 58, the Z-axial direction detector 59 and the push button switch 56 are inputted to the control signal generation means 60 (FIG. 5). The control signal generation means 60 includes a computer with a CPU and a memory and converts the signals from the X-axial direction detector 57, the Y-axial direction detector 58, and the Z-axial direction detector 59 into the control signals for the X-, Y- and Z-axial directions. The control signals are subsequently received by the drivers 41 and 42 which then move the fine instruments 18 and 23 accordingly. Also, the control signal generation means 60 also outputs a mode signal indicating whether the output control signal is the position control signal or the speed control signal in accordance with the operation of the push button switch 56. Further, the control signal generation means 60 has a X- and Y-axial neutral position flag indicating that the manipulating lever 53 is returned to a neutral position, and a Z-axial neutral position flag indicating that the rotating thumbscrew 55 is returned to a neutral position.

Figure 6:
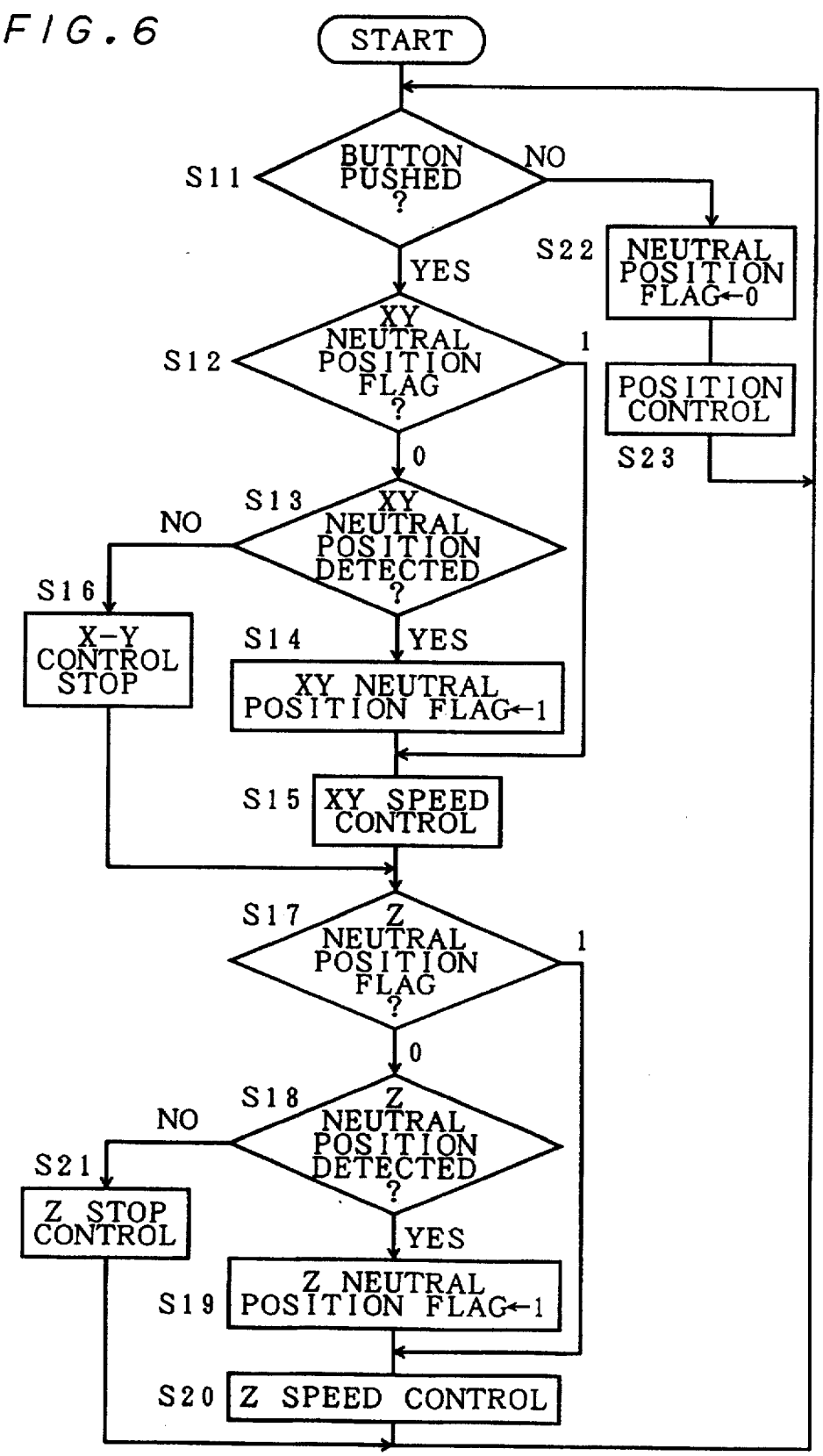
FIG. 6 is a control flow chart showing various operation of the present invention.

The control flowchart of the control signal output from the joystick 10 is shown in FIG. 6, although it should be understood that the flowchart in FIG. 6 is also applied to the joystick 11.

At Step S11, it is determined whether the push button switch 56 is pressed or not. When it is determined that the push button switch 56 is pressed, control is moved to Step S12. At Step S12, it is determined whether the X- and Y-axial neutral position flag is "0" or "1". At Step S12, when it is determined that the X- and Y-axial neutral position is "0", control is moved to Step S13. At Step S13, it is determined whether the manipulating lever 53 is at the X- and Y-axial neutral position or not. When it is determined that the manipulating lever 53 is positioned at the X- and Y-axial neutral position, control is moved to Step S14, and the X- and Y-axial neutral position flag "1" is raised. Thereafter, control is moved to Step S15 and the control signals for the X- and Y-axial directions are outputted as the speed control signals on the basis of the input signals from the X-axial direction detector 57 and the Y-axial direction detector 58. At this time, a mode signal representing the speed control mode is outputted simultaneously. In other words, movements of the joystick 10 generate a generally rapid movement of the corresponding fine instrument in corresponding directions.

At Step S12, when the X- and Y-axial neutral position flag is "1", control is moved to Step S15. At Step S13, when it is determined that the manipulating lever 53 is not at the X- and Y-axial neutral position, control is moved to Step S16, to thereby stop the output of the control signal for the X- and Y-axial directions.

Control is moved from Steps S15 and S16 to Step S17. At Step S17, it is determined whether the Z-axial neutral position flag is "0" or "1". When it is determined that the Z-axial neutral position flag is "0", control is moved to Step S18. At Step S18, it is determined whether the rotating thumbscrew 55 is at the Z-axial neutral position or not. When it is detected that the rotating thumbscrew 55 is at the Z-axial neutral position, control is moved to Step S19. At Step S19, the Z-axial neutral position flag "1" is raised. Subsequently, control is moved to Step S20 to output the control signal for the Z-axial direction as the speed control signal.

At Step S17, when it is determined that the Z-axial neutral position flag is "1", control is moved to Step S20 to output the control signal for the Z-axial direction as the speed control signal, wherein a subsequent movement of the joystick thumbscrew 56 causes generally rapid movement in the Z-direction of the corresponding fine instrument. At Step S18, when it is determined that the rotating thumbscrew 55 is not at the Z-axial neutral position, control is moved to Step S21 to stop the control output signal for the Z-axial direction.

At Step S11, when the push button switch 56 is not pressed, control is moved to Step S22. At Step S22, the X- and Y-axial neutral position flag and the Z-axial neutral position flag are set to "0". Thereafter, control is moved to Step S23 to output the output control signal as the position control signal. At this time, a mode signal representative of the position control mode is outputted simultaneously. Any subsequent movement of the joystick thumbscrew 56 or the lever 54 cause relatively fine and minute corresponding movements in corresponding directions of the corresponding fine instrument.

After completion of Steps S20, S21 and S23, control is moved to Step S1 (FIG. 3), and the above-mentioned operation is repeated.

It should be understood that the drivers 41 and 42 are capable of both course and fine movement of the arms 17 and 22 (and hence the fine instruments 18 and 23). Such drivers are typically constructed with fine and coarse movement mechanisms, the fine movement mechanism capable of fine movements, but at a slow movement rate, and a coarse movement mechanism capable of more rapid movement but with relatively little precision when compared to the fine movement mechanism.

An example of an operation of the present invention is described below.

A sample within the Petri dish 13 is photographed by the TV camera 9 and imaged on the monitor 27. An operator manipulates the various keys in the key group 33 and the joysticks 10 and 11 on the manipulating panel 48 while viewing the monitor 27, and drives both of the micromanipulators 4 and 5 to perform a treatment of a cell by the fine instruments 18 and 23. In this treatment manipulation, both the joysticks 10 and 11 are manipulated by gripping them by both hands of the operator.

Since both the joysticks 10 and 11 are identical in operation, the operation of the joystick 10 will be described below.

The operator performs the manipulation while gripping the gripper 54 by his right hand. When the push button 56 is not pressed, it means the specification of the position control mode, and the neutral position flag is "0" (Step S22). Therefore, the control signal generation means 60 outputs the position control signal in accordance with the amount of manipulation of the manipulating lever 53 and the rotating thumbscrew 55 with respect to a present position (Step S23). The micromanipulator 4 drives a course movement portion of the driver 41 and a fine movement portion of the driver 41 on the basis of the position control signal outputted from the control signal generation means 60 for performing the operation. The joystick 11 effects control of the driver 42 in a similar manner.

In the case where the manipulation of the micromanipulator 4 is intended to be achieved by speed control, the push button switch 56 provided on the head of the manipulating lever 53 is depressed. The speed control is not started until the joystick 10 is positioned at the neutral position (Steps S13 and S18). As a result, the runaway state is prevented from occurring in the operation of switching from the position control mode to the speed control mode.

When the manipulating lever 53 is moved to the neutral position while depressing the push button switch 58, the neutral position flag becomes "1" (Step S14), and the mode becomes the speed control mode with respect to the X- and Y-axial direction (Step S15). Thereafter, as far as the push button switch 56 is kept to be depressed, the speed control mode is maintained. In the speed control mode, if the manipulating lever 53 is tilted toward a desired direction, the speed control signal corresponding to the tilt angle of the manipulating lever 53 is outputted from the control signal generation means 60, and the micromanipulator 4 is operated in the X- and Y-axial direction at a speed corresponding to the speed control signal.

On the other hand, when the rotating thumbscrew 55 is returned to the neutral position while depressing the push button switch 56, the neutral position flag for the Z-axial direction becomes "1" (Step S19) so that the mode becomes the speed control mode (Step S20). Thereafter, as far as the push button switch 56 is kept to be depressed, the speed control mode is maintained. In the speed control mode, if the rotating thumbscrew 55 is rotated, the speed control signal for the Z-axial direction in accordance with the rotation angle is outputted from the control signal generation means 60, and the micromanipulator 4 is operated in the Z-axial direction at a speed corresponding to the speed control signal.

When the depression of the push button switch 56 is released, the mode is returned from the speed control mode to the position control mode (Steps S22 and S23).

In the above-described embodiment, three-dimensional direction control is capable of being performed by use of one joystick 10 (11), and the output of the position control signal and the speed control signal can be switched. In switching from the position control mode to the speed control mode, since the detection of the return to the neutral position is one condition, the runaway is prevented. Further, because the friction system is used in which the manipulating positions of the manipulating lever 53 and the rotating thumbscrew 55 are held by friction, the construction of the device is simplified thereby downsizing can be achieved.

MODIFICATIONS AND ALTERNATIVES

In the above described embodiment, the push button switch 56 could also be provided in the middle portion of the gripper 54 of the manipulating lever 53.

Further, the multi-direction control joy stick could additionally be configured so that the output of the control signal is stopped immediately after the depression of the push button switch 56 is released, and the position control signal is outputted after the manipulating lever 53 and the rotating thumbscrew 55 are returned to the neutral position once to prevent unwanted movement or prevent excessive movement.

The manipulating lever 53, could also be provided with a return centering spring, in addition to or as an alternative to the friction system used in the above embodiment to maintain position of the lever 53. The push button switch 56 may also be the type of switch that is toggleable from one position to a second position. In this case, when the push button switch 56 is depressed and allowed to stay depressed in a locked position, and the manipulating lever 53 may be configured with a spring return system, and unlocking of the push button switch 56 causes the manipulating lever 53 to respond to the friction positioning system.

When executing the speed control, because the manipulating lever 53 is switched to the spring return system by depressing the push button switch to lock it, the speed control manipulation for the X- and Y-axial directions can be executed in the same manner as the joy stick in the general spring return system. Also, when executing the position control, locking of the push button switch 56 is released.

The detection of the neutral position may be performed in a software manner.

EFFECTS OF THE INVENTION

In the multi-direction control joy stick of the present invention, because the switching means allows for the control signal generation not only when the reception means receives the switching command during the operation of the first control signal generation means but also when the detection means detects the neutral position of the manipulating lever, a runaway movement state is avoided during in the operation of switching between the position control mode and the speed control mode.

Figure 7:
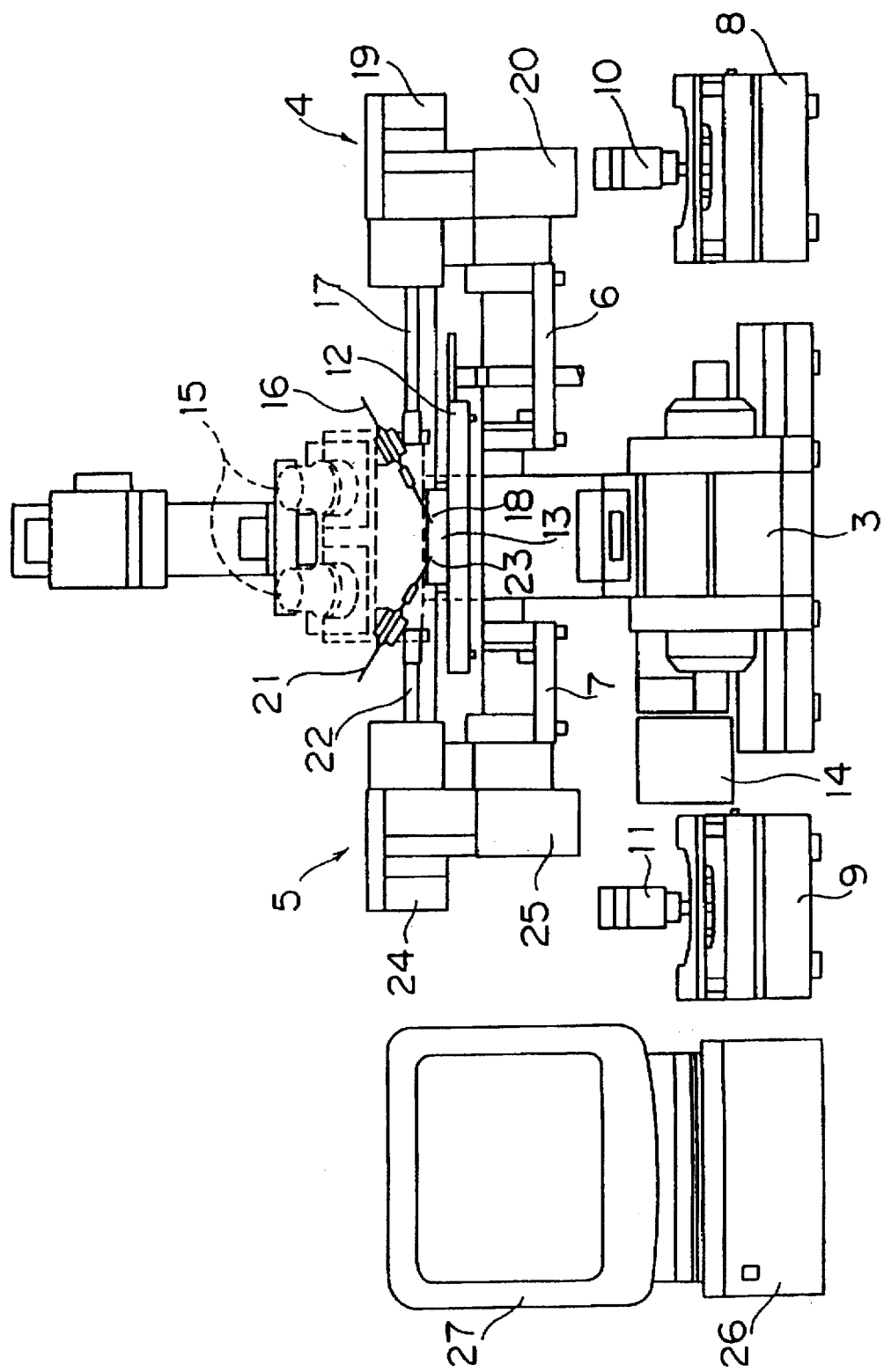
FIG. 7 is a front elevation of a micromanipulator system in accordance with a second embodiment of the present invention.

FIG. 7 illustrates a micromanipulator system in accordance with a second embodiment of the present invention. Many of the elements described above with respect to the first embodiment are also present in the embodiment depicted in FIG. 7, for instance micromanpulators 4 and 5 are disposed on the sides of a microscope 3 so that they are fixed to the microscope 3 through stages or coupling frames 6 and 7, respectively. In the figure, there is a pair of micromanipulators 4 and 5, however, another pair of micromanipulators are arranged in back of the micromanipulator 4 and 5 (downward normal to a paper).

The micromanipulators 4 and 5 are controlled in accordance with the manipulation of joy sticks 10 and 11 provided on manipulating units 8 and 9. The manipulating units are provided so as to correspond to the micromanipulators, and in the case where four micromanipulators are arranged, four manipulating units are provided. In the figure, there are shown two manipulating units 8 and 9. The manipulating units 8 and 9 may be, for instance, similar to the drivers 41 and 42 described above with respect to the first embodiment.

The microscope 3 has a manipulating stage 12 in the center thereof, on which a Petri dish 13 for accommodating a fine sample such as a cell are placed. Disposed below the stage 12 are objective lenses (not shown), and a TV camera 14 is connected to the other ends of the objective lenses. The manipulating stage 12 can be driven in the horizontal direction (X- and Y-axial directions) and in the vertical direction (Z-axial direction) by means of a driver mechanism not shown. Alternatively, the objective lenses are moved vertically to adjust the position in the Z-axial direction. Further, the microscope 3 is equipped with eye-pieces 15 by which an image through the objective lenses can be recognized.

In the micromanipulator 4, an arm 17 having an instrument holder 16 at a tip thereof is projected toward the manipulating stage 12. The instrument holder 16 is adapted to hold a fine instrument 18 such as an injection piper or an adsorption pipet. The instrument holder 16 is connected to an injector not shown or the like. The micromanipulator 4, in order to move the fine instrument 18 held by the instrument holder 16, is also equipped with a driver mechanism for driving in the horizontal direction (X- and Y-axial directions) and in the vertical direction (Z-axial direction). The driver mechanism is comprised of an X-axial stepping motor 19 for driving in the X-axial direction, a Y-axial stepping motor (not shown) for driving in the Y-axial direction, a Z-axial stepping motor 20 for driving in the Z-axial direction, and a guide rail (not shown) for guiding in each of the X-, Y- and Z-axial directions. Likewise, the micromanipulator 5 is equipped with an arm 22 having an instrument holder 21 at a tip thereof, which is projected toward the manipulating stage 12. The instrument holder 21 is adapted to hold a fine instrument 23 such as the injection piper or the adsorption pipet likewise as the fine instrument 18. The instrument holder 21 is connected to an injector not shown or the like. The micromanipulator 5 is also equipped with a driver mechanism for driving in the horizontal direction (X- and Y-axial directions) and the vertical direction (Z-axial direction) in order to move the fine instrument 23 held by the instrument holder 21. The driver mechanism is comprised of an X-axial stepping motor 24 for driving in the X-axial direction, a Y-axial stepping motor (not shown) 24 for driving in the Y-axial direction, a Z-axial stepping motor 25 for driving in the Z-axial direction, and a guide rail (not shown) for guiding in each of the X-, Y- and Z-axial directions.

The joy sticks 10 and 11 for the manipulating units 8 and 9 are tiltable forward and backward and from side to side with respect to the normal axial direction (vertical direction in FIG. 7) as described above with respect to the embodiment depicted in FIGS. 1 through 6, and can be indicative of the control amount for the micromanipulators 4 and 5 in the horizontal direction (X- and Y-axial directions). Located above the joy sticks 10 and 11 is a turning dial or thumbscrew, and the manipulation of the turning dial gives the control mount of the micromanipurators 4 and 5 in the vertical direction (Z-axial direction). The manipulating units 8 and 9 are equipped with key switches used for performing other control operation.

The manipulating signals of the manipulating units 8 and 9 are inputted to a control unit 26 which outputs a control signal for driving the micromanipulators 4 and 5 in accordance with the manipulation signal from the manipulating units 8 and 9. The control unit 26 also controls the microscope 3 to perform the focus adjustment and the movement drive of the manipulating stage 12. Moreover, a monitor 27 inputs and displays the image from the TV camera 14. Connected to the control unit 26 is a keyboard (not shown) and a mouse (not shown). The control unit 26 may be a personal computer or the like, and instructions and settings may be entered into the control unit 26 via the keyboard (not shown). Similarly, instructions and settings may be determined and designated by using icons displayed on the monitor 27 and chosen using, for instance, the mouse (not shown) in a manner consistent with a personal computer system.

Figure 8:
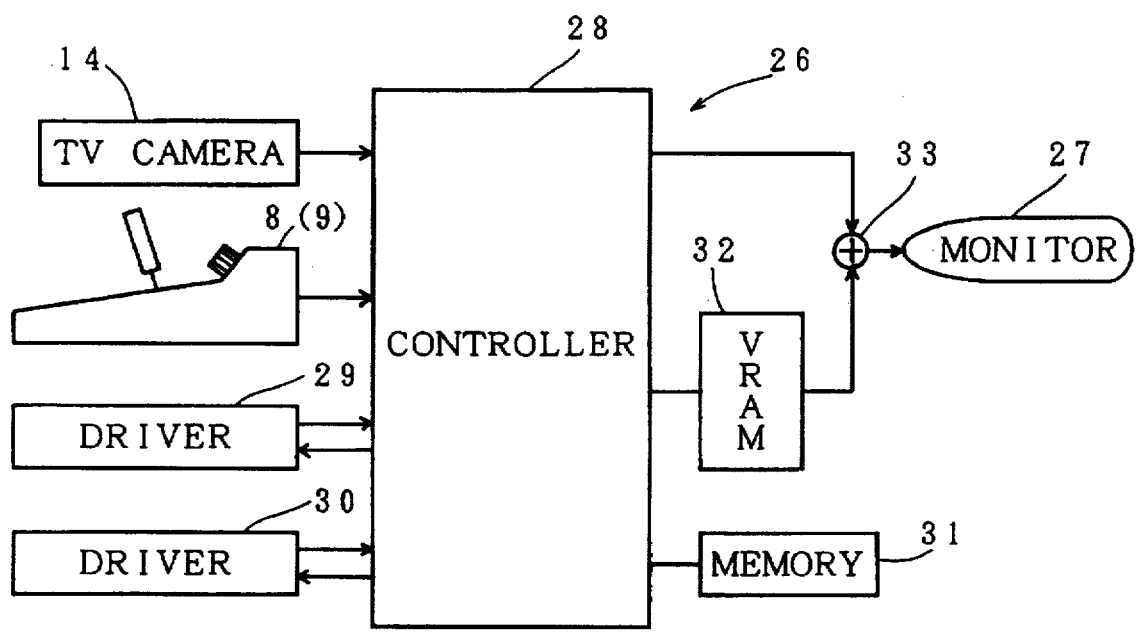
FIG. 8 is a block diagram showing the electronic interconnection of various portions of the micromanipulator system depicted in FIG. 7.

As shown in FIG. 8, the control unit 26 is equipped with a controller 28 formed of a microcomputer including a CPU, a RAM, a ROM and the like. Connected to the controller 28 are the TV camera 14, the manipulating units 8(9), drivers 29 and 30 for driving the respective motors for the micromanipulators 4 and 8 in three-axial directions, a memory 31 for storing a variety of set values or the like, a video RAM 32, and an adder 33 for superimposing the output of the video RAM 32 and the image picked up by the TV camera 14. The video RAM 32 stores information representative of scales corresponding to scale factors, or the like in correspondence with display positions, for instance, a scale in accordance with magnification, and also a mark, and the like, indicative of the positional relationship along the Z-axis direction (will be described) in correspondence with the display positions. The adder 33 is connected with the monitor 27 for displaying the superimposed image.

Figure 10:
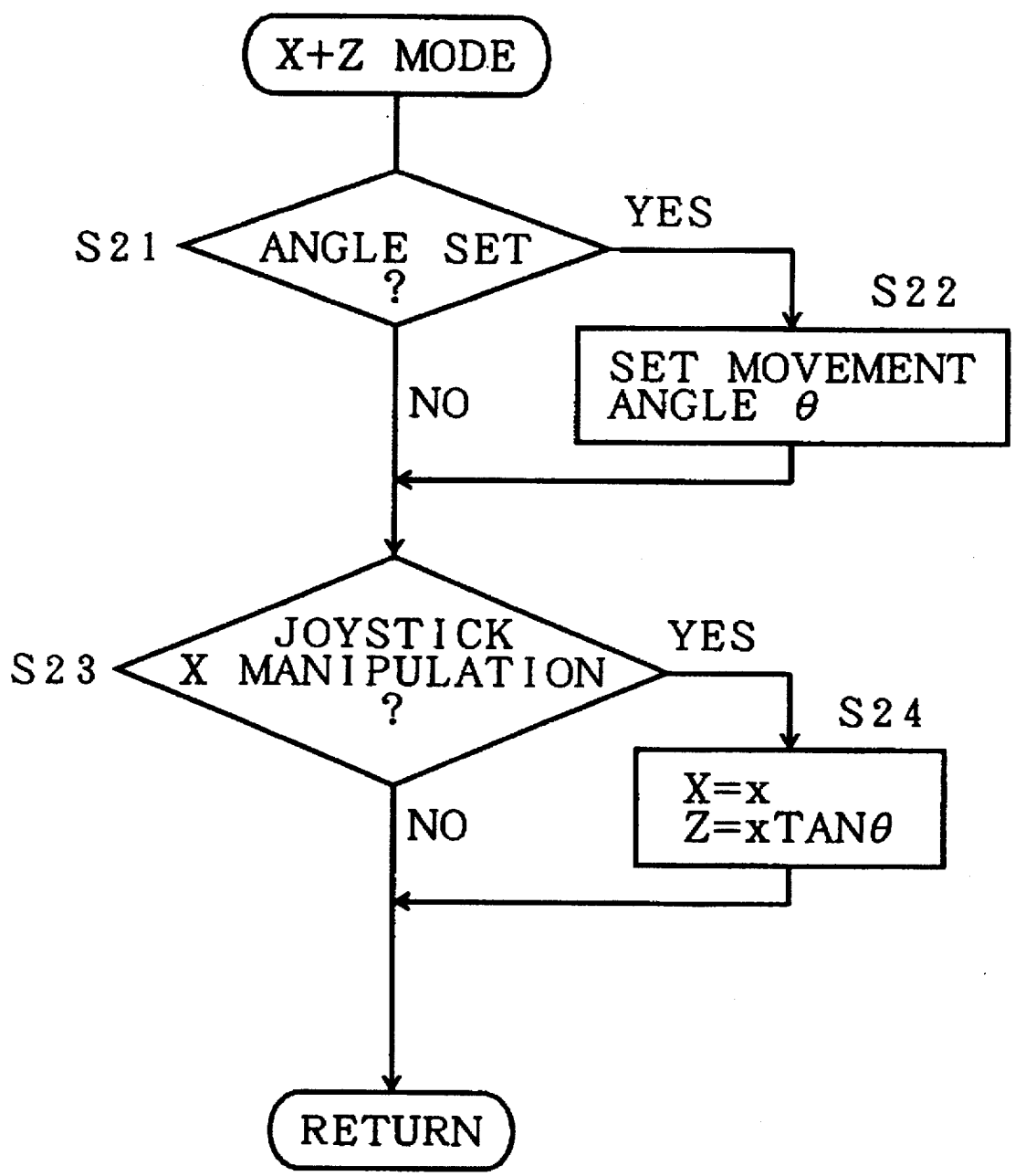
FIG. 10 is a control flowchart showing one mode of the system depicted in FIGS. 7 and 8.
Figure 11:
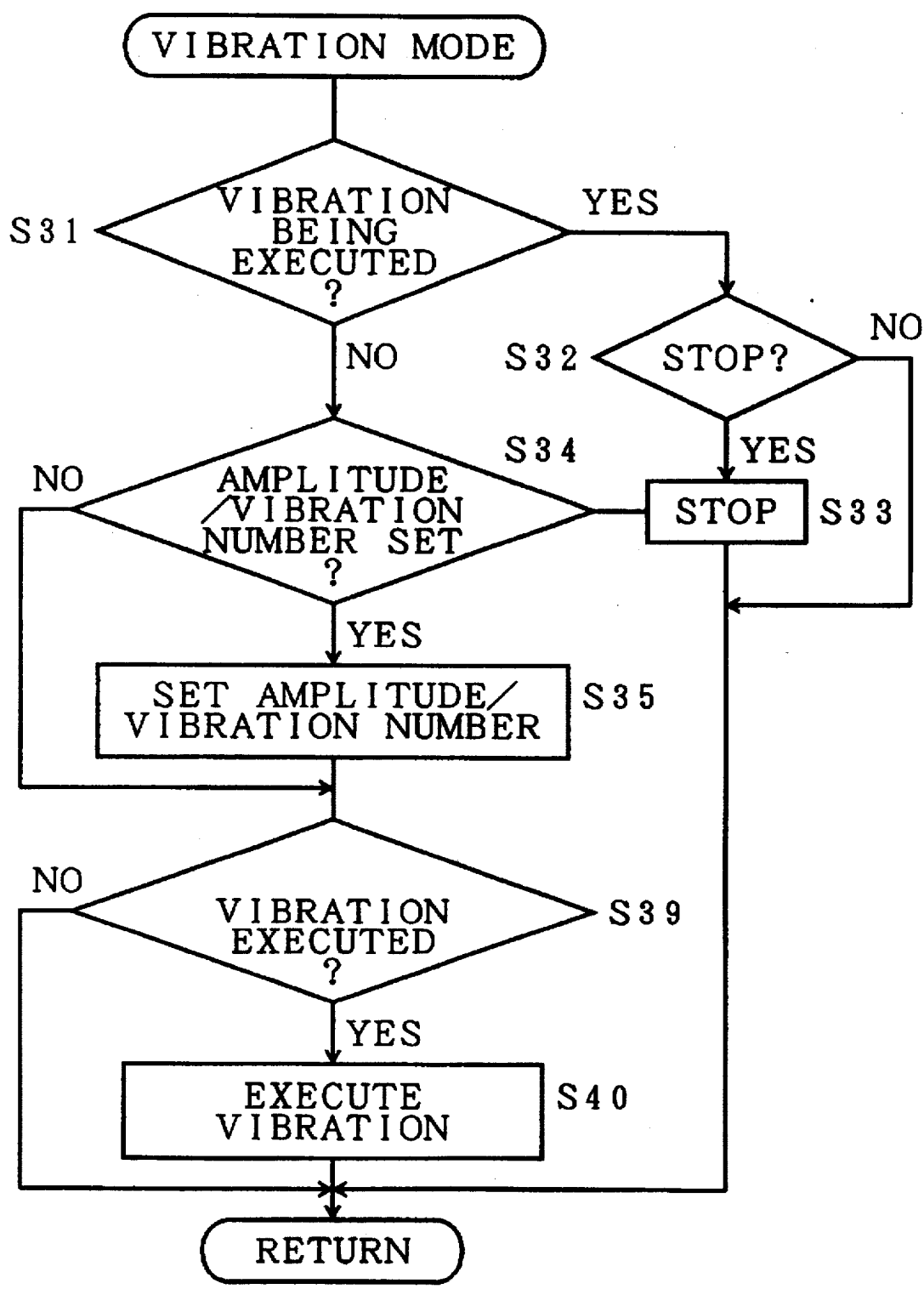
FIG. 11 is a control flowchart showing another operation mode of the system depicted in FIGS. 7 and 8.

Subsequently, the operation of the above-mentioned embodiment will be described with reference to control flow charts shown in FIGS. 9 to 11.

Figure 9:
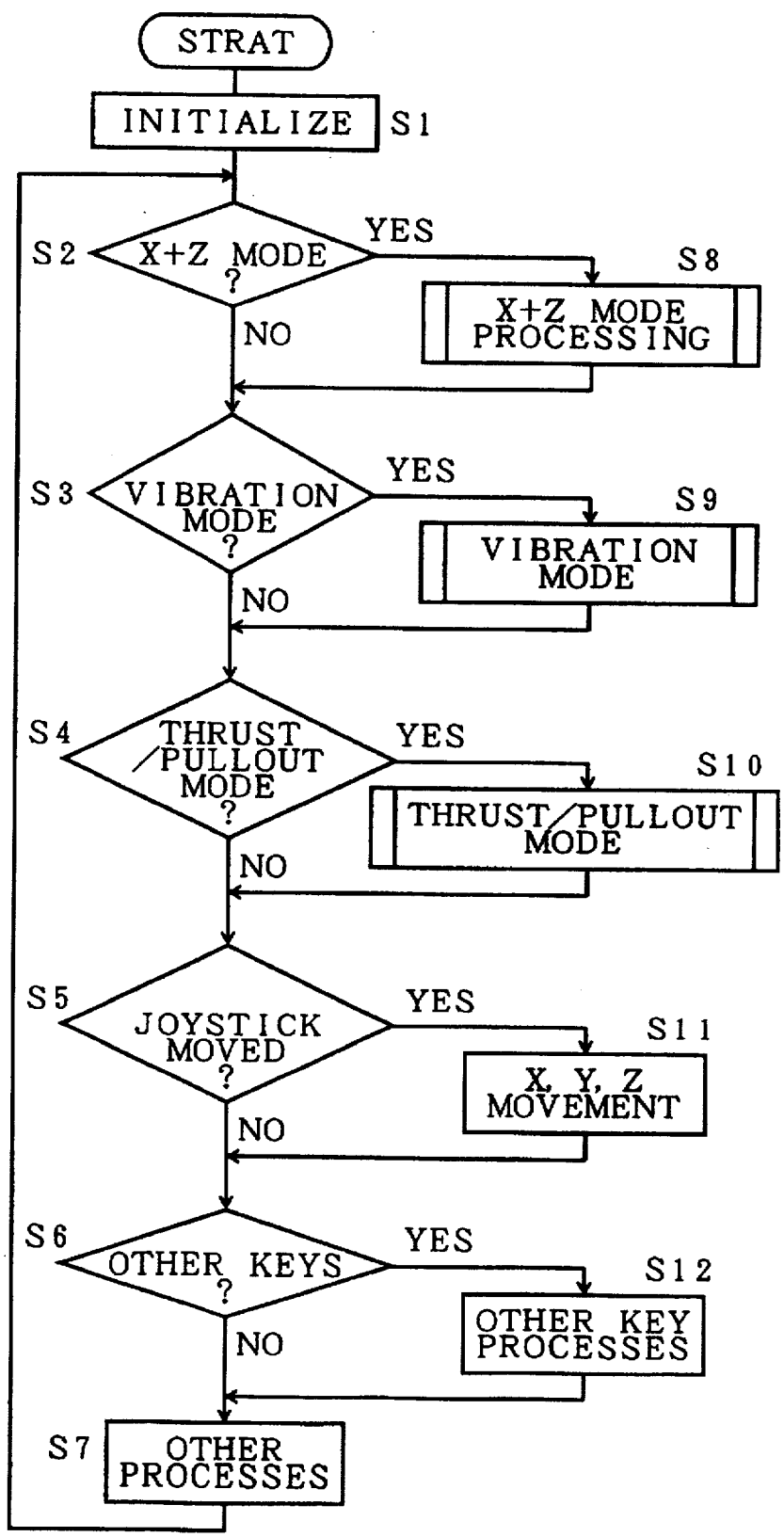
FIG. 9 is a control flowchart showing various operations of the micromanipulator system depicted in FIGS. 7 and 8.

The controller 28 performs an initial setting operation at Step S1 in FIG. 9. In this embodiment, for example, the drivers 29 and 30 for the micromanipulators 4 and 5 are set to initial positions. At Step S2, it is determined whether an (X+Z) mode is set or not. The (X+Z) mode is to control the movement of the micromanipulator 4(5) in the synthetic direction which synthesizes the X- and Z-axial directions by manipulating the joy sticks 10(11) in the X-axial direction. The (X+Z) mode can be set by operating an (X+Z) mode setting switch (not shown) provided in the manipulating unit 8(9) or by specifying an (X+Z) mode setting icon displayed on the monitor 27 in a screen. At Step S3, it is determined whether a vibration mode is set or not. The vibration mode is to minutely vibrate the fine instrument 18(23) on the basis of an angle, amplitude and the number of vibrations which may be preset. The vibration mode can be set by operating a vibration mode setting key (not shown) provided in the manipulating unit 8(9) or by specifying a vibration mode setting icon displayed on the monitor 27, likewise as that of the (X+Z) mode.

At Step S4, it is determined whether setting of the thrust/pull-out mode is executed or not. The thrust/pull-out mode is a mode in which the micromanipulator 4(5) is driven on the basis of the set angle, the movement speed and the set movement distance to move the fine instrument 18 (23) to a set position. The thrust/pull-out mode can be set by operating a thrust/pull-out mode setting key on the keyboard (not shown) provided in the manipulating unit 8(9) or by setting a thrust/pull-out setting icon displayed on the monitor 27, likewise as the (X+Z) mode setting operation.

At Step S5, it is determined whether the joy stick 10(11) is manipulated or not. If a movement is detected at S6, then control is moved to step S11 and movement of the micromanipulator 4 (or 5) is effected by the corresponding X, Y and Z stepper motors 24 and 25. At Step S6, it is determined whether other keys on the keyboard are operated or not. If the determination at Step S6 is no, control is moved to Step S7. At Step S7, other processing is executed, and control is then returned to Step S2. If it is determined that other keys are operated at Step S6, then control is moved to Step S12 to perform processing in accordance with the key operation.

(X+Z) Mode

If it is determined that the (X+Z) mode setting is executed at Step S2, control is moved to Step S8. At Step S8, the (X+Z) mode processing is executed as shown in FIG. 10.

In the (X+Z) mode processing, at Step S21, it is determined whether setting of a movement angle θ is executed or not. When setting the movement angle θ, central is moved to Step S22. At Step S22, with operation of the set keys (not shown) provided in the manipulating units 8(9) or input of numeral values onto a screen of the monitor 27, the set value is stored in an X memory 31 as the movement angle θ. If it is determined at Step S21 that the movement angle θ is not set, a default value is automatically set to the movement angle θ. At Step 23, it is determined whether control in the (X+Z) direction is executed or not by manipulation of the joy stick 10(11) in the X-axial direction. When the control in the (X+Z) direction is executed by manipulation of the joy stick 10(11) in the X-axial direction, control is moved to Step S24. At Step S24, the X-axial direction control amount X=x and the Z-axial direction control amount Z=x tan θ of the micromanipulator 4(5) are set in accordance with the manipulation amount of the joy stick 8(9) in the X-axial direction. Thereafter, control is returned to the main routine depicted in FIG. 9.

At Step S5, if the joy stick 8(9) is manipulated, the micromanipulator 4(5) is driven at the set movement angle θ on the basis of that manipulation amount. For example, when the (X+Z) direction control has been set by the manipulation in the X-axial direction, the micromanipulator 4(5) is controlled with the X-axial direction control amount X=x and the Z-axial direction control amount Z=x tan θ on the basis of the manipulation amount x of the joy stick 8(9) in the X-axial direction.

Vibration Mode

At Step 3, when it is determined that setting of the vibration mode is executed, control is moved to Step S9. At Step S9, the vibration processing shown in FIG. 11 is executed. In the vibration processing, at Step S31, it is determined whether the vibration operation is being executed or not. When the vibration operation is being executed, control is moved to Step S32. At Step S32, it is determined whether the vibration operation is to be stopped or not. In this embodiment, when a request for stopping the vibration operation has been made by an operator, control is moved to Step S33 to stop the vibration operation.

Figure 13:
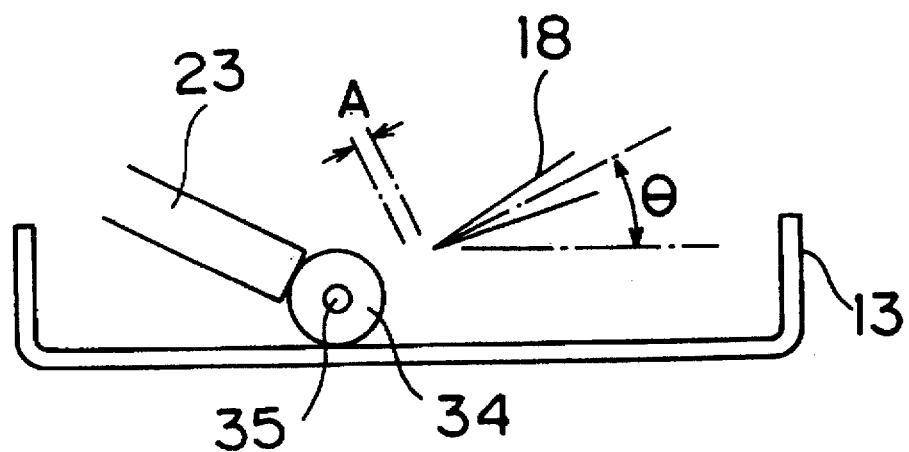
FIG. 13 is a side view of a petri dish mounted in the micromanipulator system depicted in FIGS. 7 and 8, demonstrating features of the mode depicted in FIG. 11.

At Step S31, when it is determined that the vibration operation is not being executed, control is moved to Step S34. At Step S34, it is determined whether setting of the amplitude and the number of vibrations is executed or not. When setting the amplitude and the number of vibrations, control is moved to Step S35, and the amplitude and the number of vibrations inputted by the operator are stored in the memory 31. For example, as shown in FIG. 13, in the case where a cell 34 within the Petri dish 13 is held by the fine instrument 23 such as an adsorption pipet or a vacuum filled tube, and the fine instrument 18 is vibrated minutely for treatment, an amplitude A at which the fine instrument 18 is vibrated and the number of vibrations assumed to be required are inputted by the operator. In the case where the amplitude and the number of vibrations are not set, the amplitude and the number of vibrations are automatically set by use of default values. At Step S39, it is determined whether the vibration operation is executed or not. In this embodiment, after waiting for a request for execution of the vibration operation by the operator, control is moved to Step S40. At Step S40, the amount of control for the micromanipulator 4(5) in each axial direction is operated in accordance with the amplitude and the number of vibrations stored in the memory 31, and the drive signal corresponding to that amount of control is given to the stepping motor in each axial direction.

In this embodiment, in the case where the (X+Z) mode has been set at Step S2, the amount of control in each axial direction is operated on the basis of the movement angle θ set at Step S22. Accordingly, in the case of FIG. 13, the drive signal corresponding to a cos θ is supplied to the X-axial stepping motor 19(24) of the micromanipulator 4(5) whereas the drive signal corresponding to a sin θ is supplied to the Z-axial stepping motor 20(25). The respective drive signals are generated so that the forward and backward signals are alternately generated, and supplied to the respective stepping motors in synchronism with each other. As a result, the fine instrument 18 performs the fine vibrations having the amplitude a and the movement angle θ (longitudinal direction). At Step S39, when the execution of the vibration operation has not been requested, control is returned to the main routine depicted in FIG. 9.

Thrust/Pull-out

Figure 12:
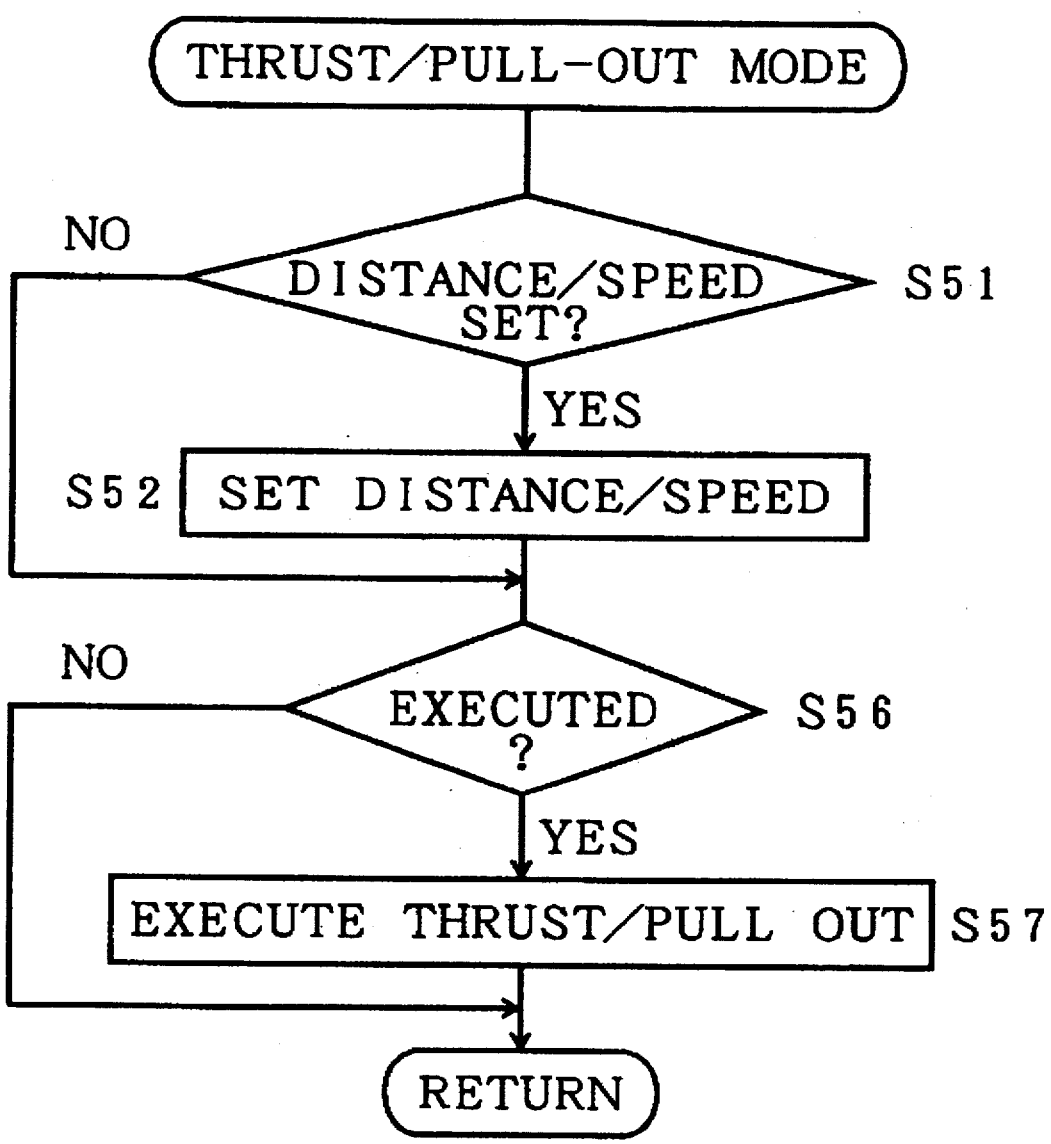
FIG. 12 is a control flowchart showing another operation mode of the system depicted in FIGS. 7 and 8.

At Step S4, when it is determined that the setting of the thrust/pull-out mode is executed, control is moved to Step S10. At Step S10, the thrust/pull-out processing is executed as shown in FIG. 12.

Figure 14:
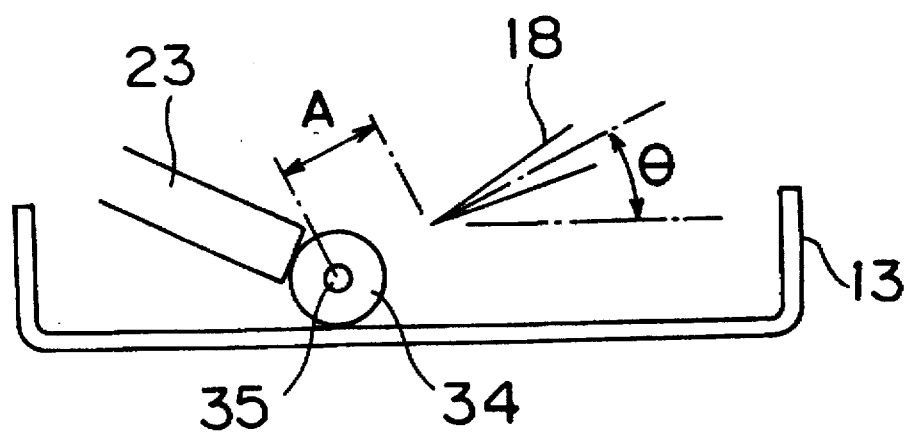
FIG. 14 is a side view of a petri dish mounted in the micromanipulator system depicted in FIGS. 7 and 8, demonstrating features of the mode depicted in FIG. 12.

In the thrust/pull-out processing, at Step S51, it is determined whether the movement distance and the movement speed are set or not. When setting the movement distance and the movement speed, control is moved to Step S52. At Step S52, by the operation of the setting keys (not shown) provided in the manipulation unit 8(9), or by the input operation on the screen of the monitor 27 by the operation, the movement distance and the movement speed are stored in the memory 31 as setting values. For example, as shown in FIG. 14, let us consider a case where the tip of the fine instrument 18 is moved to the center position of a cell nucleus 35 of the cell 34 adsorbed by the fine instrument 23 for adsorption. In this case, the movement distance of the fine instrument 18 is A. Hence, the operator inputs the movement distance A, and also inputs the movement speed on demand, When the setting of the movement distance and the movement speed is not executed, the default values are automatically set as the movement distance and the movement speed.

At Step S56, it is determined whether the execution of the thrust/pull-out operation is executed or not. When the execution of the thrust/pull-out operation has been requested by the operator, control is moved to Step S57. At Step S57, the amount of movement of the micromanipulator 4(5) in each axial direction is calculated on the basis of the movement distance and the movement speed stored in the memory 31, and the control signal based on the calculated amount of movement is supplied to each of the stepping motors. When the (X+Z) mode has been set at Step S2, the amount of movement in each axial direction is calculated on the basis of the set movement angle θ. Therefore, in the case of FIG. 14, the drive signal corresponding to a cos θ is supplied to the X-axial stepping motor 19(24) of the micromanipulator 4(5) whereas the drive signal corresponding to a sin θ is supplied to the Z-axial stepping motor 20 (25) so that they are synchronous with each other. When the execution of the thrust/pull-out operation has been requested to be stopped, control is returned to the main routine.

Step S6 in the main routine includes the operation of releasing the setting of the (X+Z) mode, the vibration mode, and the thrust/pull-out mode. When a command for releasing the setting has been made, the respective parameters set in the mode are stored in the memory 31 as default values, and the mode is released.

EFFECT OF THE INVENTION

In the micromanipulator system according to the present invention, the ratio of the amount of movement of the micromanipulator in each axial direction is calculated on the basis of the manipulation amount in a specified direction by the manipulating means and the movement angle set by an angle setting means in the unit 26, and on the basis of that ratio of the amount of movement, the control signal for each axial direction is supplied to the micromanipulator, and therefore the micromanipulator can be driven at a set movement value. Hence, the micromanipulator is capable of being driven at an arbitrarily set angle, and the fine instrument is capable of being moved at an arbitrarily set angle by only the operation of the manipulating means in a specified direction. As a result, the fine instrument is capable of being controlled in the longitudinal direction thereof with excellent operability.

In the case of provision of the amplitude/vibration number setting means and the vibration control means, the control signal for minutely vibrating the fine instrument is supplied to the micromanipulator on the basis of the movement angle set by the angle setting means and the amplitude and the number of vibrations set by the amplitude/vibration number setting means, and therefore the fine instrument is capable of being minutely vibrated at an arbitrary angle. Hence, the fine instrument is capable of being minutely vibrated in the longitudinal direction thereof.

Also, in the case of provision of the distance/speed setting means and the thrust/pull-out control means, the control signal for each axial direction is supplied to the micromanipulator on the basis of the movement angle set by the angle setting means and the movement distance and the movement speed set by the distance/speed setting means to thereby drive the micromanipulator, and therefore the fine instrument is capable of being moved with accuracy for the movement distance at the movement speed, which have been set at an arbitrary angle. Hence, the fine instrument is capable of being moved in the longitudinal direction thereof with accuracy.

Further operations of the above-described embodiment will be described with reference to control flow charts shown in FIGS. 15 and FIG. 17.

Figure 15:
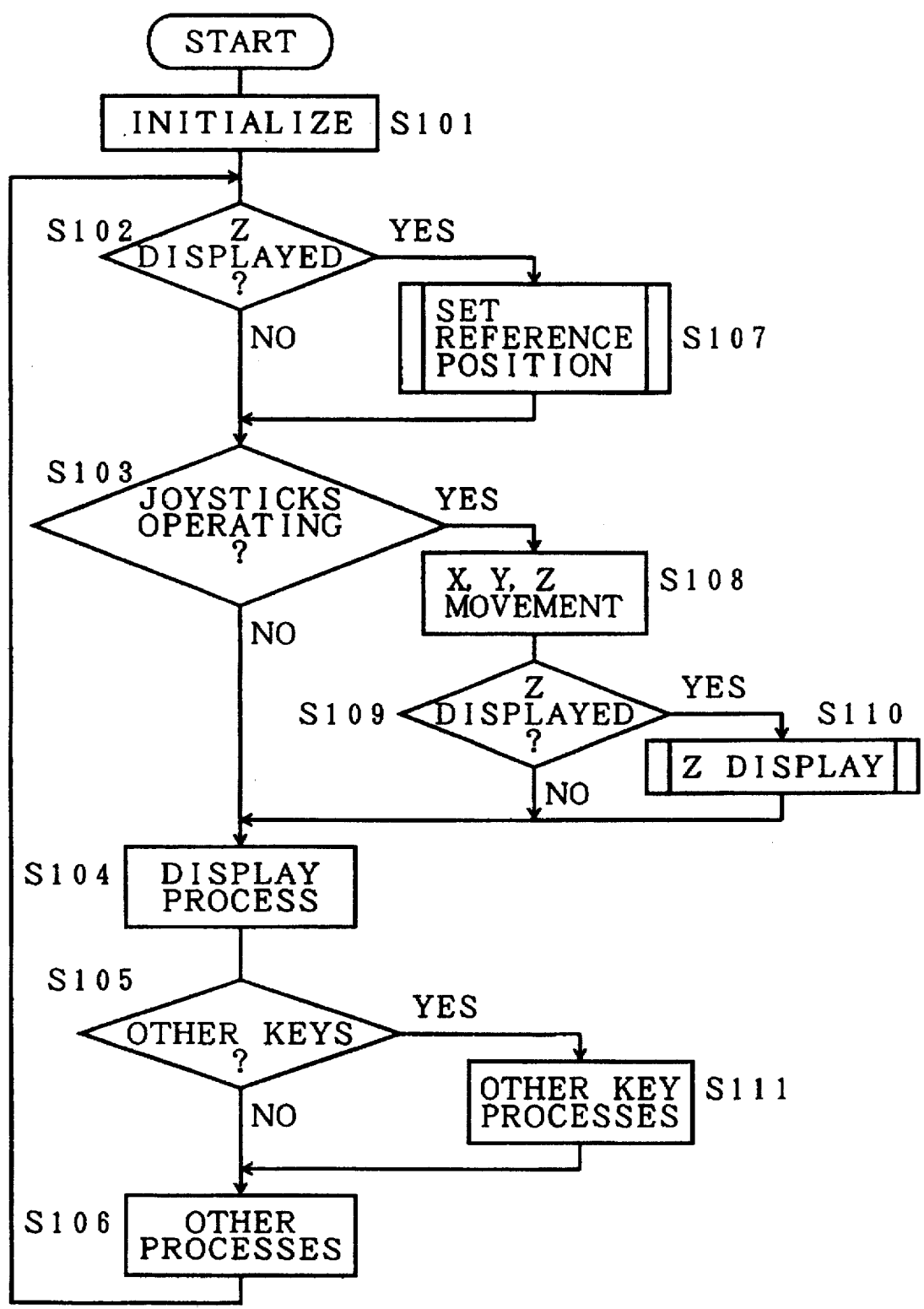
FIG. 15 is a control flowchart showing a sequence of operations of the system depicted in FIGS. 7 and 8.

In the control section 28, the initial setting operation is carried out at a step S101 of FIG. 15. At this step, for instance, the drive units 29 and 30 of the micromanipulators 4 and 5 are set to the initial positions. At a step S102, a judgement is made as to whether or not the Z-position is displayed. Then, at a step S103, a check is done as to whether or not the joysticks 10 and 11 are operated. At a step S104, a display process operation is carried out (will be described later). A further judgement is made as to whether or not other keys are manipulated. When the judgement result at the step S105 becomes NO, the process operation is advanced to a step S106. At this step S106, other process operations are performed and thereafter the process operation is returned to the step S102. When it is so determined at the step S105 that other keys are manipulated, the process operation is advanced to a step S111 at which the process operation defined by the key manipulation is executed.

Figure 16:
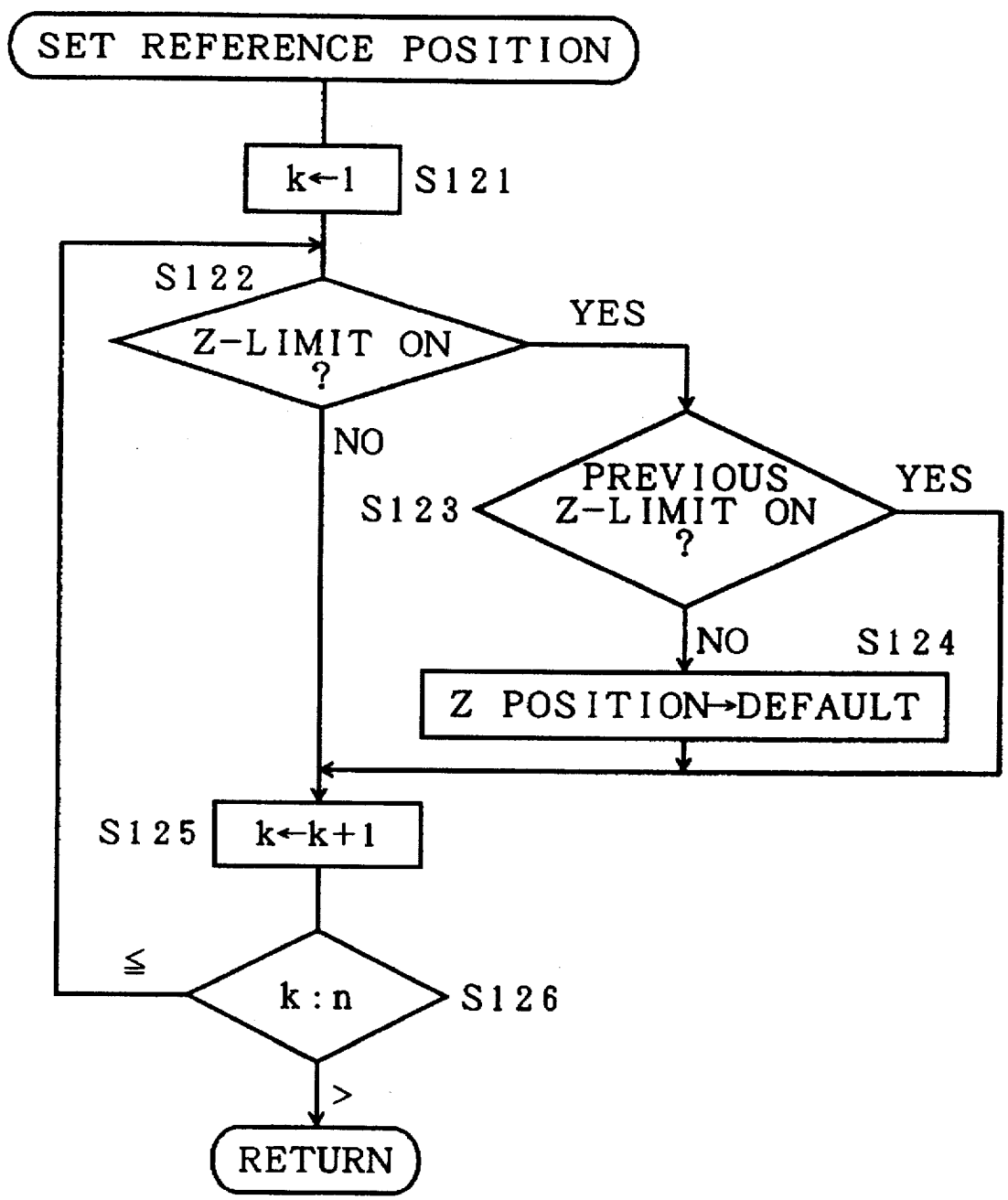
FIG. 16 is a control flowchart showing a further sequence of operation of the system depicted in FIGS. 7 and 8.

At the step S102, when it is so determined that the Z-position is displayed, the process operation is advanced to a step S107. At the step S107, a process operation to set the reference position along the Z direction as shown in FIG. 16, is carried out.

In the reference position setting process, a variable "K" is substituted by an initial value 1 at a step S121. At a step S122, another judgement is done as to whether or not a lower limit position "Z-Limit" of the micromanipulator along the Z direction is set. At a step S122, when it is so determined that the lower limit position "Z-Limit" is ON, the process operation is advanced to a step S123. At the step S123, a check is made as to whether or not the previous Z-limit setting operation was ON with respect to the K-th micromanipulator. If the previous Z-limit setting operation was ON, then the process operation is advanced to a step S125.

When the preceding Z-Limit setting operation is OFF, the process operation is advanced to a step S124. At the step S124, a determination is made that the Z-Limit setting key was turned ON by manipulating the joy sticks and the like at the step S112, the present position of the K-th micromanipulator along the Z-axis direction at this time is set as the reference position and then is stored into the memory 31. At the step S125, 1 is added to the variable "K". At a step S126, a comparison is made between this variable "K" and the number "n" of micromanipulators arranged in this system. When the variable "K" is lower than, or equal to the number "n" of micromanipulators, the process operation is advanced to the step S122, at which the lower limit position "Z-Limit" is set for the succeeding micromanipulator. When it is so determined that the variable "K" becomes larger than the number "n", the process operation is returned to the main routine.

At the step S103, in FIG. 15, when it is determined that the joy sticks 10 and 11 of the operation units 8 and 9 are manipulated, the process operation is advanced to a step S108. At this step S108, either the drive unit 29 or the drive unit 30 is driven in response to the operation direction of the manipulated joy stick so as to control the micromanipulators 4 and 5. At a step S109, a check is done as to whether or not the Z-position display operation is set. When the Z-position display operation is set, the process operation is moved to a step S110. Then, at this step S110, such a Z-position display process as shown in FIG. 17 is carried out.

Figure 17:
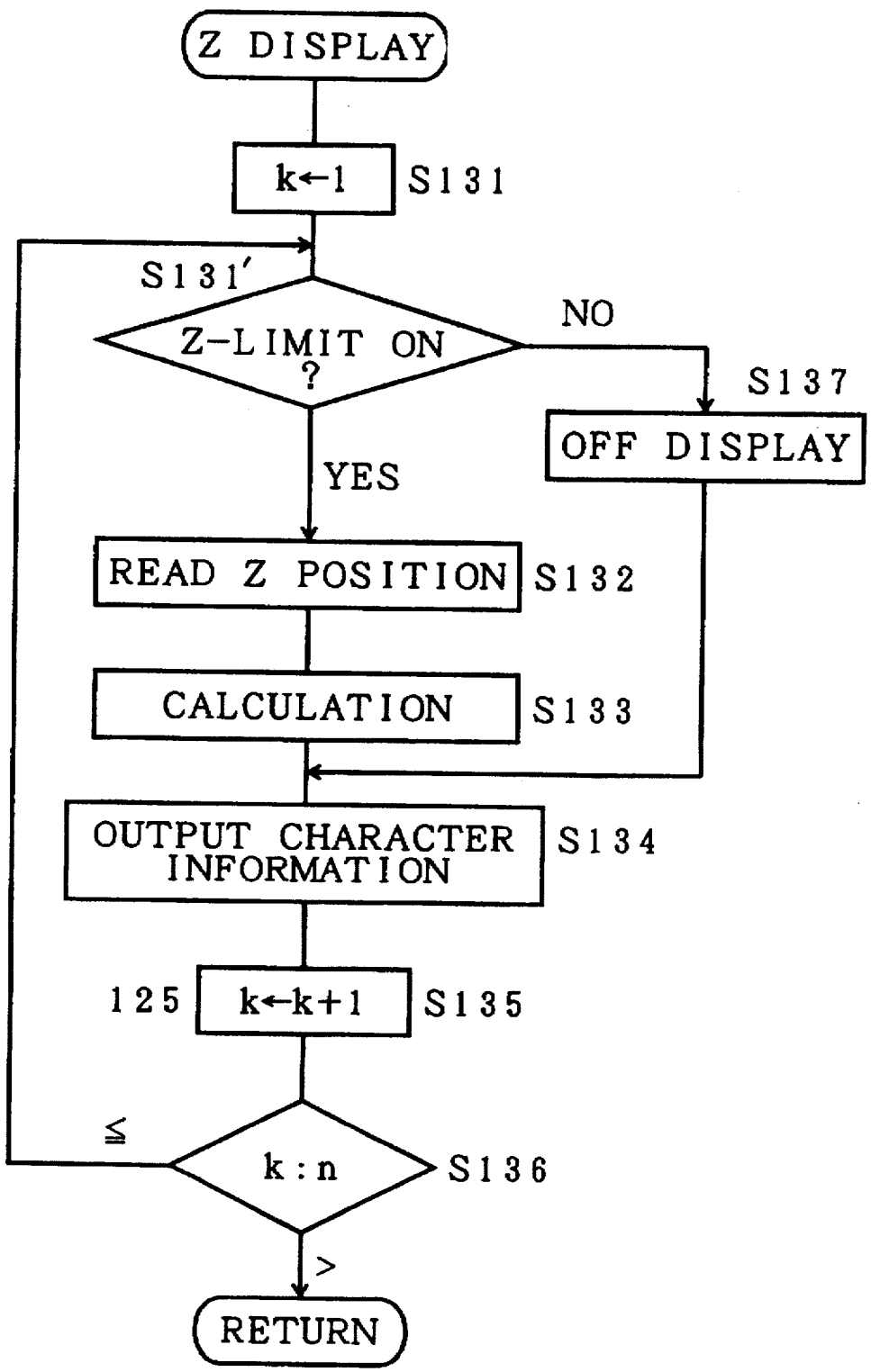
FIG. 17 is a control flowchart showing still further operations of the system depicted in FIGS. 7 and 8.

In the Z-position display process operation depicted in FIG. 17, an initial value 1 is substituted for the variable "K" at a step S131. At a further step S131', a check is made as to whether or not the Z-Limit setting operation of the K-th micromanipulator is ON. When the Z-Limit setting operation is OFF, the process operation is advanced to a step S137. At the step S137, a representation that the Z-Limit setting operation is OFF is set.

At step S131', if the Z-Limit setting operation is ON, the process operation is advanced to a step S132. At this step S132, the Z-direction position of the K-th micromanipulator is read. As to the Z-direction position of the micromanipulator, since the moving distance is grasped by the control section 28 of the control unit 26 based on the control signal supplied to the drive unit 29 (30), the Z-direction position of the micromanipulator may be specified based upon this moving distance. At a step S133, the position of the tip portion of the instrument held by the instrument holder is specified based on the Z-direction position of the micromanipulator, which has been read at the step S132. In this embodiment, the reference position set by way of the lower limit position "Z-Limit" is recognized as "0", and it is determined how far the relevant micromanipulator has been moved from this reference position. Accordingly, the Z position of the micromanipulator read at the step S132 is coincident with the moving mount of the tip portion of the fine instrument along the Z direction. As a consequence, the Z-direction moving mount of the micromanipulator read at the step S132 is fetched as the Z-direction moving mount of the fine instrument.

At a step S134, both of a bar representation and a numeral value representative of the distance are outputted as character information, and this bar representation indicates the present Z-direction position measured from the reference position based on the tip position of the fine instrument. In this case, such a representation "Z-Limit OFF" is made with respect to the micromanipulator set at the step S137. At a step S135, 1 is added to the variable "K". At a step S136, the variable "K" is compared with the number (quantity) "n" of the micromanipulators. If the variable "K" is lower than, or equal to "n", then the process operation is advanced to the step S132 at which the Z-position display process operation as to the subsequent micromanipulator is carried out. Conversely, when the variable "K" becomes larger than "n", the process operation is returned to the main routine.

In the display process defined at the step S104 (FIG. 15), the image picked up by the TV camera 14 is displayed. At this time, when the Z-position display is set, the character information indicative of the Z-direction position of the micromanipulator, which is outputted at the step S110, is synthesized with the image obtained from the TV camera 14, and the synthesized image is displayed on the monitor 27. At this time, for instance, such a representation as shown in FIG. 18 is made on the monitor 27.

Figure 18:
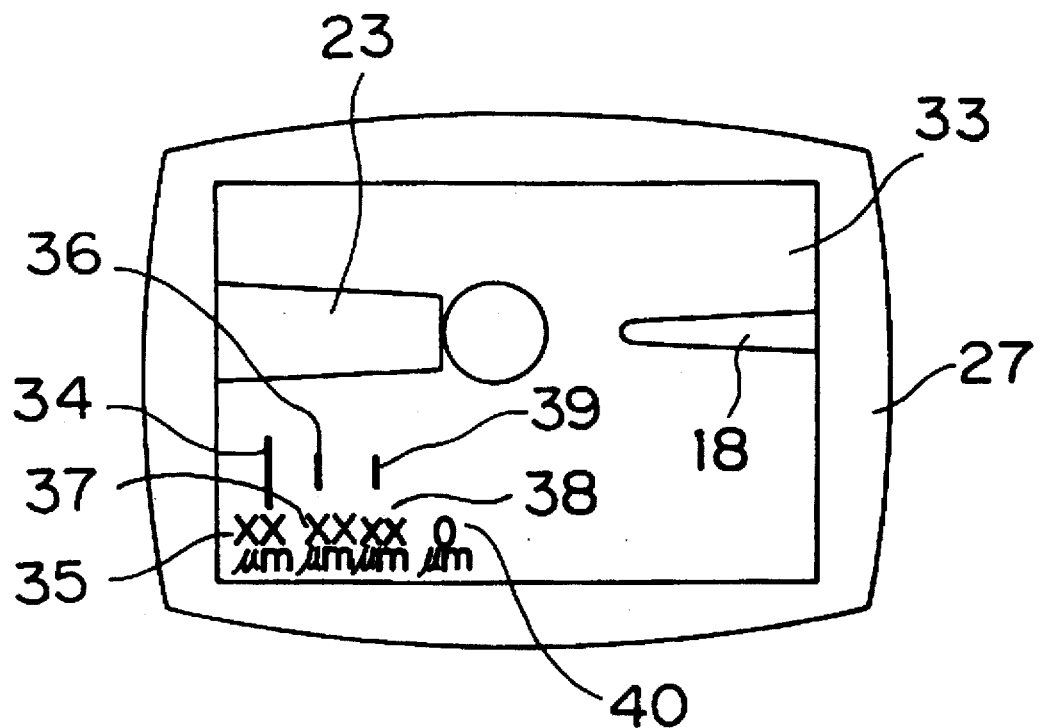
FIG. 18 is an example of an image formed on a monitor in the system depicted in FIGS. 7 and 8.

In FIG. 18, the height position of the tip portion of the fine instrument held by each of the micromanipulators is displayed on the lower left portion of the screen 33 of the monitor 27. The tip position of the fine instrument held by the first micromanipulator is represented as a bar representation 34 indicating its height measured from the reference position, and the distance thereof is indicated on a numeral value display section 35. Similarly, the height of the second micromanipulator is represented by way of a bar representation 36 and a numeral value display section 37. Similarly, as to the third micromanipulator, its height is displayed by a bar representation 39 and a numeral value display section 38. Since there is no movement of the fourth micromanipulator from the lower limit position "Z-Limit", "0" is displayed on a numeral value display section 40 and no bar representation is made.

MODIFICATIONS:

(a) Although the "Z-Limit" position is set as the reference position in the reference position setting process operation defined at the step S7, an arbitrary position may be set as the reference position.

(b). The Z-direction position may be displayed even for such a micromanipulator where no "Z-Limit" position has been set.

(c). Although the character information indicative of the Z-direction position is combined with the image of the TV camera 14 to obtain the superimposing representation, another display device on which the Z-direction position may be displayed.

(d). The total number of micromanipulators is not limited to that of the above-described embodiment.

(e). The Z-position representation may be realized by only either the numeral representation, or the bar representation.

Advantages of the Invention:

In the micromanipulator system according to the present invention, the display means displays thereon both of the picked-up image and the height position of the tip portion of the fine instrument held by each of the micromanipulators. As a result, the position relationship about the tip portions of the micromanipulators can be three-dimensionally grasped based upon the plain image produced by the image pick-up operation and the representations of the height positions, so that operabilities of the micromanipulators can be improved. Since the Z-coordinate values of all the micromanipulators employed in the system can be grasped, it is easily possible to grasp the movement of the overall system. Also, when the calls are absorbed by the absorbing pipet, the tip position of the absorbing pipet can be grasped, whereby the positional relationship between the sample and the fine instrument held by another micromanipulator can be readily grasped.

Figure 19:
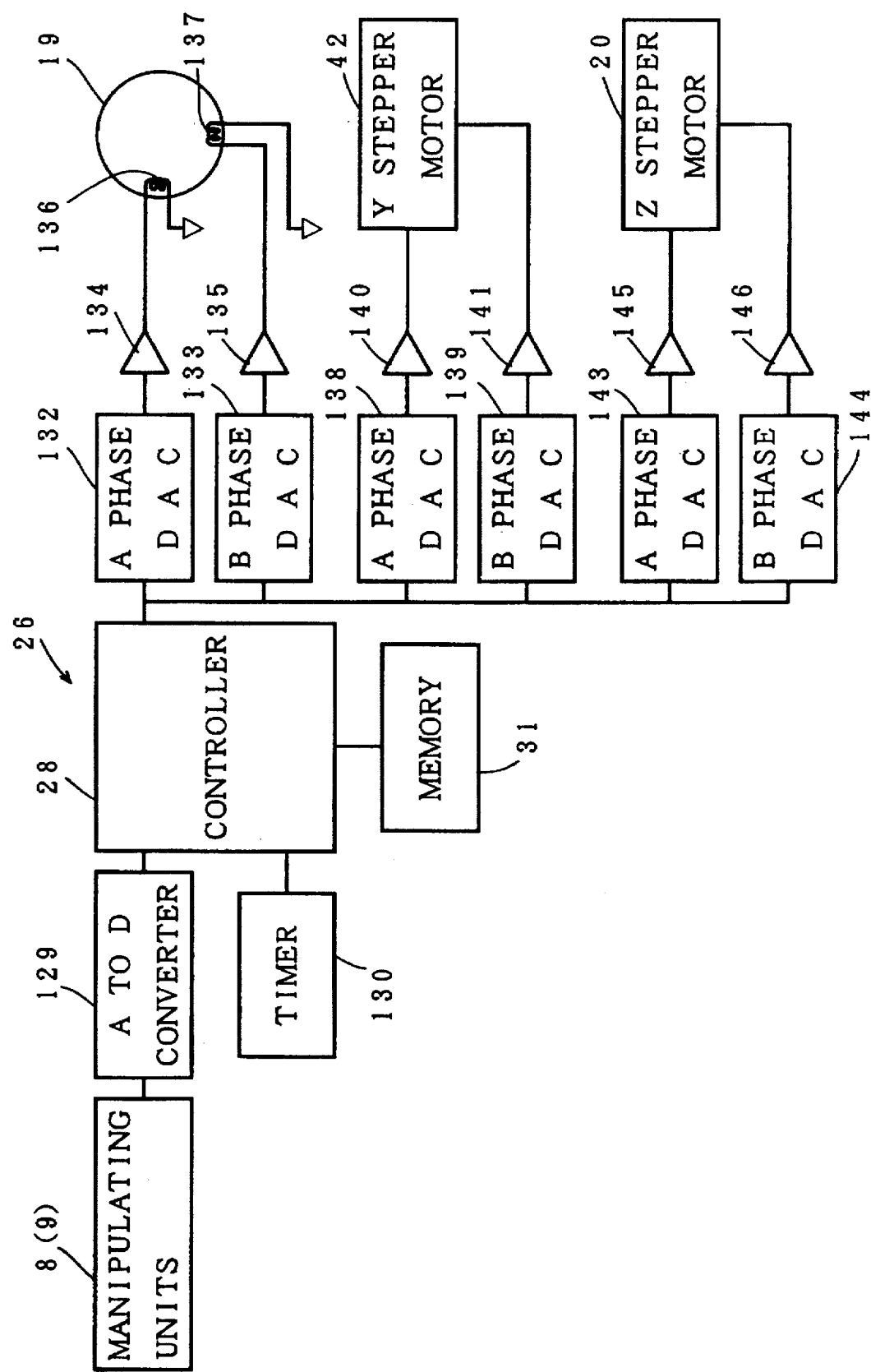
FIG. 19 is a schematic block diagram of the controller circuitry employed in the micromanipulator system depicted in FIGS. 7 and 8.

In another aspect of the present invention, as shown in FIG. 19, the controller 28 is connected to an A/D converter 129 is connected which A/D-converts a voltage signal in accordance with the joystick manipulating amount entered from the manipulation unit 8 (9). The A/D converter 129 will determine whether the voltage signal derived from the manipulating unit 8(a) corresponds to the position data, or the speed (velocity) data, and converts it into the corresponding digital signal which will then be inputted into the controller 28. Also, to the controller 28, a timer 130 for producing a timer interrupt is connected. The memory 31 for storing the energizing data corresponding to the respective microsteps and other parameters is connected to the controller 28. D/A converters 132, 133, 138, 139, 143 and 144 are connected to the controller 28, which are provided with respect to the respective phases of an X-axis stepper motor 19, a Y-axis stepper motor 42, and a Z-axis stepper motor 20. It should be note that each of these stepper motors 19, 42, 20 is a two-phase type stepper motor. Power amplifiers 134 and 135 are connected to the D/A converter 132 corresponding to the A-phase of the X-axis stepper motor 19 and to the D/A converter 133 corresponding to the B-phase thereof. An A-phase coil 36 of the X-axis stepper motor 19 is connected to the power amplifier 134, whereas a B-phase coil 137 thereof is connected to the power amplifier 135. The D/A converters 138 and 139 for the Y-axis supply the energizing data via the respective power amplifiers 140 and 141 to the Y-axis stepper motor 42. The D/A converters 143 and 144 for the Z-axis similarly inputs the energizing data via the respective power amplifiers 145 and 146 to the Z-axis stepper motor 20.

Figure 21:
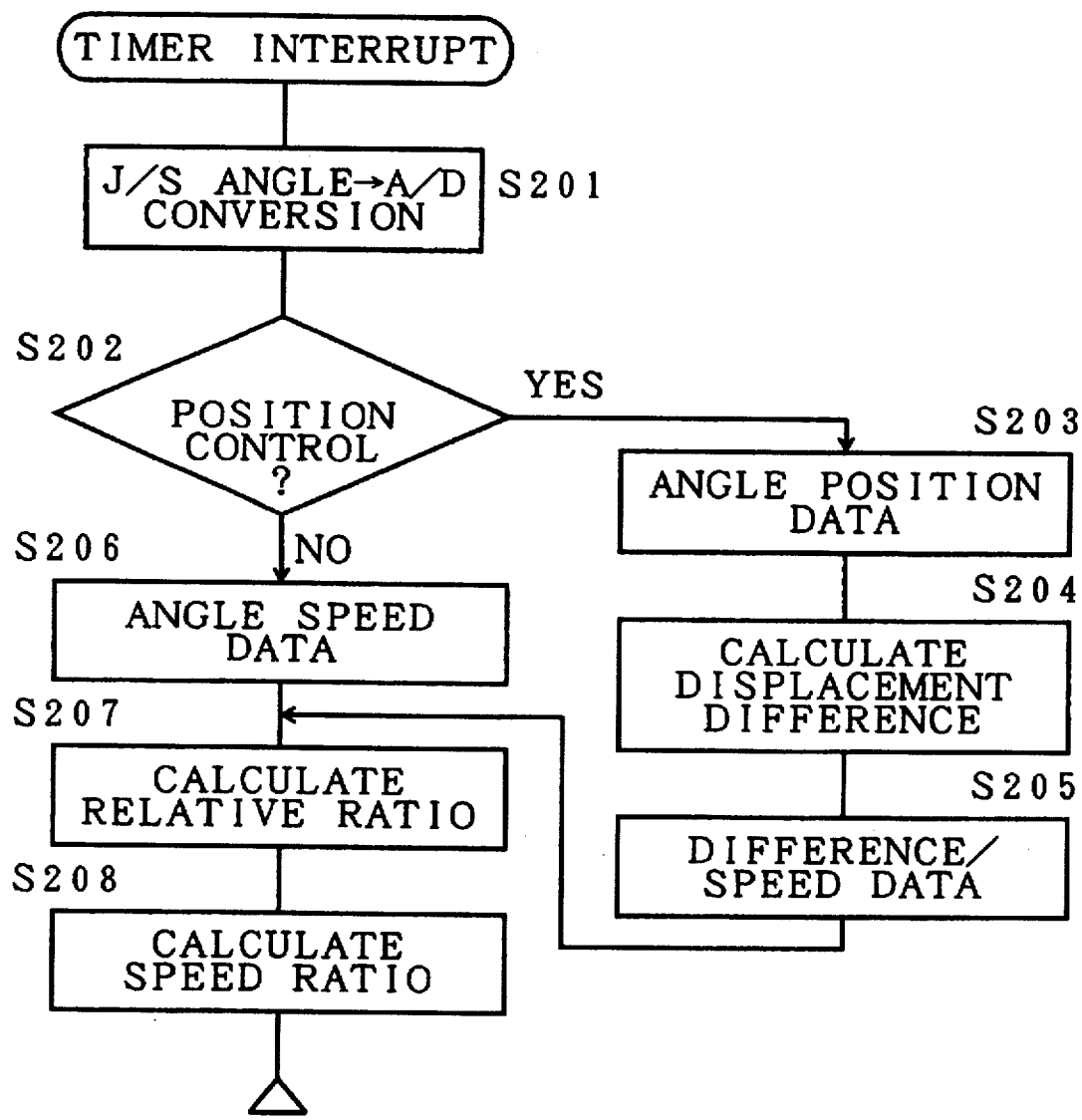
FIG. 21 is a control flow chart of operations of the controller.
Figure 22:
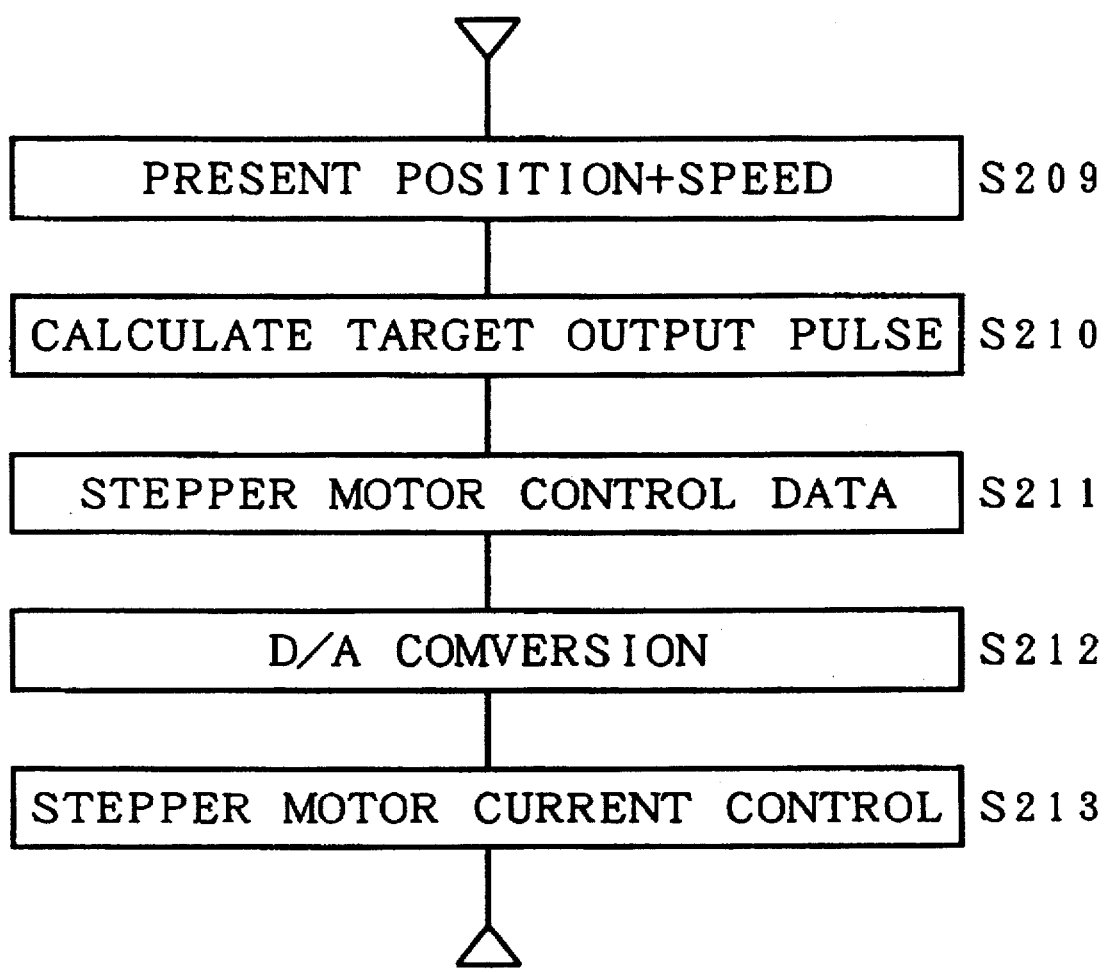
FIG. 22 is a control flow chart of operations of the controller.

Operations of this embodiment will now be described with reference to a timing chart shown in FIG. 20 and control flow charts indicated in FIG. 21 to FIG. 22.

Figures 20A, 20B, 20C, 20D, 20E, 20F, 20G, 20H:
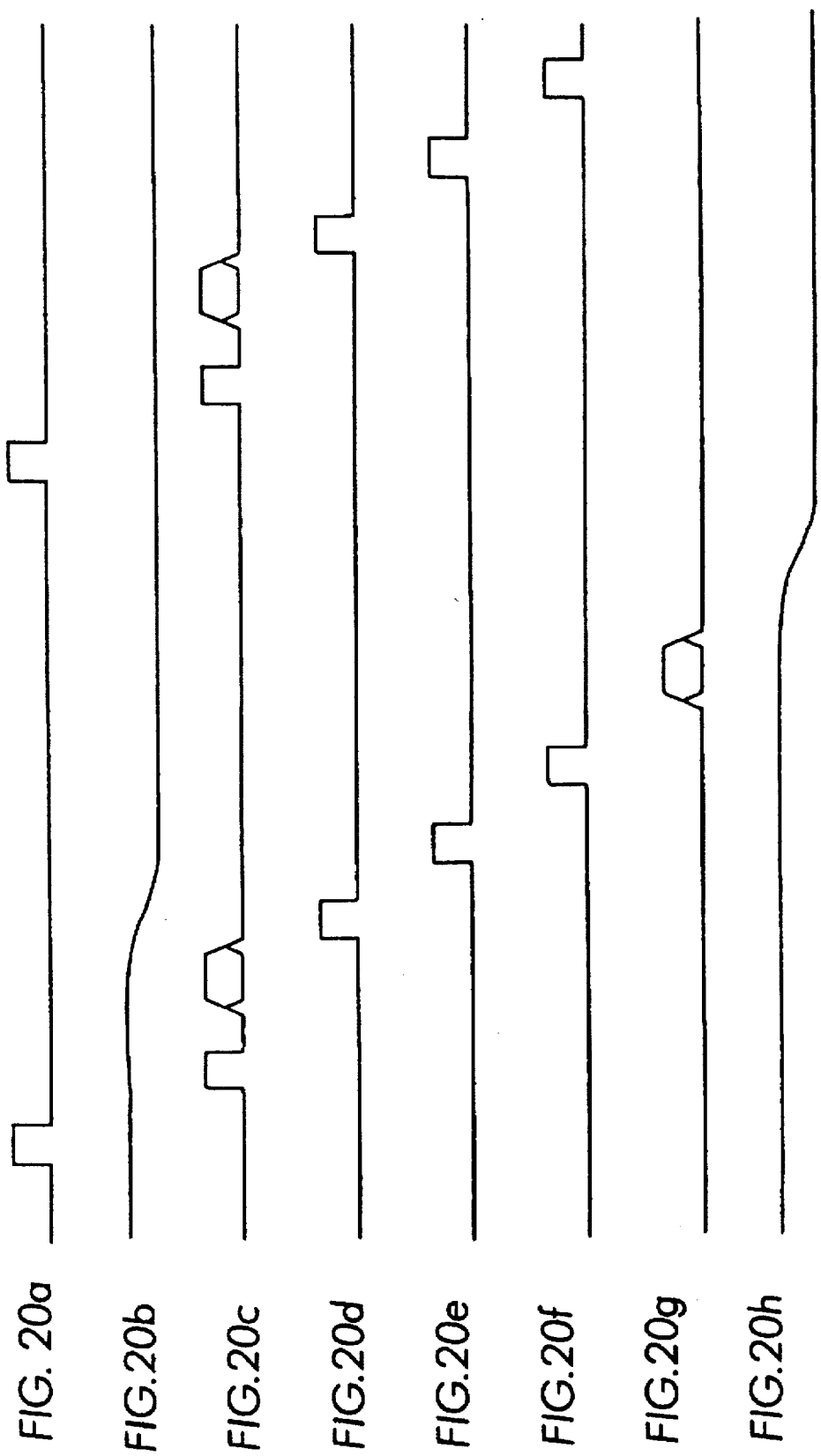
FIG. 20 is a chart representing timing signals generated by the circuitry of the controller.

The timer 130 produces an interrupt signal in a constant period (see FIG. 20a). The manipulating unit 8 outputs a voltage signal (FIG. 20b) in response to the operation angle of the joy stick 10. Upon generation of the interrupt signal by the timer 130, this voltage signal is converted into a digital signal (FIG. 20c) by the A/D converter 129 at a step S201. At a step S202, a judgement is made as to whether or not the voltage signal outputted by the manipulating unit 8 corresponds to the position control signal. In case of this position control signal, the process operation is advanced to a step S203. At the step S203, such a digital signal corresponding to the operation angle of the joy stick 10 is fetched as position data. At a step S204, the present position of the stepper motor is calculated. The stepper motors 19, 42, 20 are driven under such condition that one full step is subdivided into 32 microsteps. Further, 1 microstep is subdivided into 1024 virtual subdivision units. As a consequence, 1 full step is virtually subdivided into 32,768 virtual subdivision units (32×1,024=32,768). Assuming now that the required full step number of the stepper motor 19 is selected to "m" within the range where the fine instrument 18 can be moved along the X-axis direction, the present position of the stepper motor 19 is represented by such a numeral value within the range of m×32,768. Similarly, the present positions of the stepper motors 42 and 20 are expressed by numeral values in the virtual subdivision unit along the Y-axis direction and the Z-axis direction. Further, the moving target positional data obtained at the step S203 are similarly represented as the numeral values in the virtual subdivision unit and then a difference between the moving target positional dam and the present positional data of the stepper motor is calculated.

At a step S205, this calculated difference is converted into speed data corresponding to a distance between the present position and the moving target position. Similarly, this speed data is expressed by a numeral value in the virtual subdivision unit, which is calculated based on the difference between the present position and the moving target position. Thereafter, the process operation is moved to a step S207.

When it is so determined that the voltage signal of the joy stick is not equal to the position control signal at the step S202, the process operation is moved to a step S206. At this step S206, the digital signal produced in accordance with the operation angle of the joy stick 10 is converted into the speed (velocity) data.

At a step S207, a calculation is made of a relative ratio of moving mounts as to the stepper motors 19, 42, 20 along the respective axial directions based on the moving angle for driving the micromanipulator 4. The moving angle may be inputted by operating the manipulating unit 8, or an icon on the monitor 27. Otherwise, the arranging angle of the fine instrument 18 previously stored in the memory 31 is employed as this moving angle. At a further step S208, a ratio of speeds of the respective stepping motors along these axial directions is calculated based on the relative ratio of moving mounts calculated at the previous step S7 (FIG. 20d).

At a step S209, the present position of the stepper motor is calculated in the virtual subdivision unit. In this case, the speeds along the respective axial directions are calculated based on the speed ratio calculated at the step S208, and then the speed data calculated in the virtual subdivision unit is added to the present position data (FIG. 20e). At a step S210, the calculation result at the step S9 is divided by such a dividing number (i.e., 1024) which is defined by subdividing the microstep by the virtual subdivision unit (see FIG. 20f), so that a target output pulse for each microstep is determined. At a step S211, the energizing data of the stepper motor is produced in response to the target output pulse calculated at the step S210 (FIG. 20g). This energizing data is previously calculated for each microstep and then is stored into the memory 31. Assuming now that 1 step is subdivided into 32 microsteps and the stepper motor is rotated by 1 turn with 4 full steps, 128 pieces (82×4=128) of energizing data have been stored into the memory 31. The energizing data of the memory 31 are read out in accordance with the phase of the target output pulse calculated at the previous step S210 in unit of microstep, and then are outputted as the energizing data at a step S211. At a step S212, the energizing data outputted at the step S211 are converted into the corresponding analog signals by the D/A converters 132 and 133 (FIG. 20h). At a step S213, the voltage signals derived from the D/A converters 132 and 133 are applied as energizing currents by the power amplifiers 134 and 135 to the coils 136 and 137, so that the stepper motor 19 is energized. Similarly, the energizing data and supplied also the Y-axis stepper motor 42 and the Z-axis stepper motor 20 so as to drive these stepper motors in response to the operations of the manipulating unit.

MODIFICATIONS:

(a). The subdivision number as well as the virtual subdivision number of the micro step are not limited to those of the above-described embodiment.

(b). The interrupt operation by the timer need not be periodically executed.

(c). The A/D converting operation need not be performed every time the interrupt demand is issued. The A/D converting operation may be executed in the interrupted routine (normally, main routine).

Advantages of the Invention

In accordance with the present invention, since the microstep of the stepper motor to be driven at the microstep is further subdivided in the virtual subdivision unit, the moving speed is calculated in the virtual subdivision unit in correspondence with either the moving speed, or the moving position entered by the input means, and then the target out-put pulse is produced in the microstep unit based upon the calculated moving speed and the present position of the stepper motor, the stepper motor can be driven at the constant frequency with the variable speed without employing the high frequency oscillator. That is, the continuous speed control can be realized. Also, when the micromanipulator is driven along the direction defined by synthesizing a plurality of axial directions with each other, the driving mount for the X axis in response to the moving direction can be correctly obtained, so that even when the control period is prolonged, coasting of the micromanipulator can be avoided.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A micromanipulator system, comprising:

micromanipulators provided independently in three axial directions which are orthogonal to each other for moving a fine instrument three-dimensionally;

manipulating means which is manipulatable in each of said three axial directions for specifying a movement position of said fine instrument;

angle setting means for setting a movement angle of said fine instrument;

operating means for calculating the ratio of the movement amounts of said micromanipulators in each of said three axial directions on the basis of the amount of manipulation of said manipulating means in a specified direction and the movement angle set by said angle setting means; and control means for giving a control signal for each of said three axial directions to said micromanipulator on the basis of the ratio of the amount of movement from said operating means.

2. A micromanipulator system as claimed in claim 1, further comprising:

amplitude/vibration number setting means for setting an amplitude and the number of vibrations of said fine instrument when said fine instrument is vibrated minutely; and vibration control means for supplying a control signal for each of said three-axial directions to said micromanipulators on the basis of the ratio of the amount of movement calculated by said operating means in accordance with the movement angle set by said angle setting means, and the amplitude and the number of vibrations set by said amplitude/vibration number setting means, to make said fine instrument vibrated minutely.

3. A micromanipulator system as claimed in claim 2, further comprising:

distance/speed setting means for setting the movement distance and the movement speed when said fine instrument is at the time of the thrust/pull-out operation; and thrust/pull-out control means for supplying a control signal for each of said three-axial dimensions to said micromanipulators on the basis of the ratio of the amount of movement calculated by said operating means in accordance with the movement angle set by said angle setting means, and the movement distance and the movement speed set by said distance/speed setting means, to make said fine instrument thrust/pullout operated.

4. A micromanipulator system, comprising:

a micromanipulator provided independently in three-axial directions which are orthogonal to each other for moving a fine instrument three-dimensionally, manipulating means which is manipulatable in each of said three-axial dimensions for specifying the movement position of said fine instrument;

amplitude/vibration number setting means for setting an amplitude and the number of vibrations of said fine instrument when said fine instrument is vibrated minutely, and vibration control means for supplying a control signal for each of said three-axial directions to said micromanipulators on the basis of the amplitude and the number of vibrations set by said amplitude/vibration number setting means to make said fine instrument vibrated minutely.

* * * * *